United States Patent [19]

Ikeda et al.

[11] Patent Number: 5,598,887
[45] Date of Patent: Feb. 4, 1997

[54] AIR CONDITIONER FOR VEHICLES

[75] Inventors: Susumu Ikeda; Toshimi Isobe; Atsuo Inoue, all of Isesaki; Akihiro Tajiri, Wako; Choji Sakuma, Wako; Nobuyuki Yuri, Wako; Mitsuru Ishikawa, Wako, all of Japan

[73] Assignees: Sanden Corporation, Gunma-ken; Honda Giken Kogyo Kabushiki Kaisha, Tokyo, both of Japan

[21] Appl. No.: 323,221

[22] Filed: Oct. 14, 1994

[30] Foreign Application Priority Data

Oct. 14, 1993 [JP] Japan .................................. 5-257226
Feb. 25, 1994 [JP] Japan .................................. 6-028607

[51] Int. Cl.⁶ .......................... F25B 29/00; F25D 17/06
[52] U.S. Cl. .......................... 165/202; 62/90; 62/196.4; 62/324.6; 165/240
[58] Field of Search .................... 62/90, 324.6, 160, 62/196.4; 165/29

[56] References Cited

U.S. PATENT DOCUMENTS 5,299,431  4/1994  Iritani et al. ........................... 62/90 X
5,388,421  2/1995  Matsuoka ................................ 62/90 X Primary Examiner—William E. Wayner
Attorney, Agent, or Firm—Lyon & Lyon

[57] ABSTRACT

An air conditioner for vehicles that prevents icing and lack of visibility from developing on window glass of a vehicle during heating, and which permits a dehumidifying operation to be made without lowering of the air blowing temperature. The air conditioner is of a heat pump type comprising a compressor, an exterior heat exchanger, and a first interior heat exchanger, which are provided together with a second interior heat exchanger used as a heat radiator at least during heating. Further, piping lines are provided for introducing a refrigerant gas for passage through the second interior heat exchanger to the exterior heat exchanger through an expansion means, and for introducing the refrigerant gas for passage through the second interior heat exchanger to the first interior heat exchanger through a first expansion means. Thus, dehumidification in the vehicle can be simultaneously performed during heating by respectively performing a heat radiating operation at the second interior heat exchanger and a heat absorbing operation at the first interior heat exchanger.

42 Claims, 22 Drawing Sheets

AIR CONDITIONER FOR VEHICLES

BACKGROUND OF THE INVENTION

1. Field of the Invention

The present invention relates to an air conditioner for vehicles for performing cooling and heating in a passenger cabin of the vehicle, and particularly to an air conditioner which is useful in electric automobiles and the like.

2. Description of the Related Art

An air conditioner of a heat pump type is generally used in vehicles such as electric automobiles which have no internal heat source such as an internal combustion engine. Such an air conditioner comprises mainly a compressor, a four-way valve, an exterior heat exchanger, expansion means and an interior heat exchanger. The interior heat exchanger is interchangeably used as a heat absorber or a heat radiator by means of refrigerant cycles using the four-way valve, to perform cooling and heating in the vehicle cabin.

Basically, the conventional air conditioner described above can perform operations only in a cooling mode and a heating mode. Thus, drawbacks arise in that poor visibility is apt to occur on the window glass of the vehicle when performing heating under high humidity such as during rain or snow. Further, dew deposited on the interior heat exchanger evaporates upon changeover from cooling to heating, resulting in similar poor visibility as described above. Further, a drawback arises in that the blowing air temperature of the air conditioner is inevitably lowered even during dehumidification, and comfort to the passengers is greatly impaired.

SUMMARY AND OBJECTS OF THE INVENTION

It is a general object of the present invention to provide an air conditioner for vehicles which does not deteriorate visibility of window glass in a vehicle during heating, and wherein a dehumidifying operation can be performed without lowering of the blowing air temperature.

It is a substantial object of the present invention to provide an air conditioner, preferably for use in vehicles such as electric automobiles, in which dehumidification can be performed simultaneously with heating, and wherein the compressor can be operated with high efficiency.

It is another object of the present invention to provide an air conditioner of a heat pump type suitable for use in vehicles, the air conditioner including a compressor, an exterior heat exchanger, a first interior heat exchanger, a first expansion means and a second expansion means, for performing cooling and heating in a passenger cabin of the vehicle by changing refrigerant cycles using a four-way valve or the like, comprising:

- a second interior heat exchanger for use as a heat radiator at least during heating;
- a piping line for introducing a refrigerant gas which has passed through a second interior heat exchanger to the exterior heat exchanger through the second expansion means and;
- a piping line for introducing the refrigerant gas which has passed through the second interior heat exchanger to the first interior heat exchanger through the first expansion means.

It is a still another object of the present invention to provide an air conditioner for vehicles comprising:

- a compressor;
- a four-way valve having a first port connected to a discharge port of the compressor;
- an exterior heat exchanger having one end thereof connected to a second port of the four-way valve;
- a first expansion valve having an inlet connected to the other end of the exterior heat exchanger through a first control valve;
- a first interior heat exchanger having an inlet connected to an outlet of the first expansion valve and an outlet connected to an inlet port of the compressor;
- a second interior heat exchanger having an inlet connected to a fourth port of the four-way valve through a second control valve and an outlet connected between the first control valve and the first expansion valve; and
- a second expansion valve having an inlet connected between the first control valve and the first expansion valve and an outlet connected to the other end of the exterior heat exchanger, wherein:
  - a second port of the four-way valve is connected to the inlet of the second interior heat exchanger through a third control valve; and
  - a third port of the four-way valve is connected to the inlet port of the compressor.

It is a still another object of the present invention to provide an air conditioner for vehicles comprising:

- a compressor;
- a four-way valve having a first port connected to a discharge port of the compressor;
- an exterior heat exchanger having one end thereof connected to a second port of the four-way type valve;
- a first expansion valve having an inlet connected to the other end of the exterior heat exchanger through a first control valve;
- a first interior heat exchanger having an inlet connected to an outlet of the first expansion valve and an outlet connected to an inlet port of the compressor;
- a second interior heat exchanger having an inlet connected to a fourth port of the four-way valve and an outlet connected between the first control valve and the first expansion valve; and
- a second expansion valve having an inlet connected between the first control valve and the first expansion valve and an outlet connected to the other end of the exterior heat exchanger, wherein:
  - a third port of the four-way valve is connected to the inlet port of the compressor; and
  - a second control valve provided at one of the inlet and outlet sides of the second interior heat exchanger.

It is a still another object of the present invention to provide an air conditioner for vehicles comprising:

- a compressor;
- a four-way valve having a first port connected to a discharge port of the compressor;
- an exterior heat exchanger having one end thereof connected to a second port of the four-way valve;
- a first expansion valve having an inlet connected to the other end of the exterior heat exchanger through a first control valve;
- a first interior heat exchanger having an inlet connected to an outlet of the first expansion valve and an outlet connected to a suction port of the compressor;

a brine/refrigerant heat exchanger having a refrigerant line inlet connected to a fourth port of the four-way valve through a second control valve and a refrigerant gas line outlet connected between the first control valve and said first expansion valve;

a second interior heat exchanger connected to a brine line of the brine/refrigerant heat exchanger through a pump; and a second expansion valve having an inlet connected between the first control valve and the first expansion valve and an outlet connected to the other end of the exterior heat exchanger, wherein:

a second port of said four-way valve is connected to the refrigerant gas line inlet of the brine/refrigerant heat exchanger through a third control valve; and a third port of the four-way valve is connected to a suction port of the compressor.

It is a still another object of the present invention to provide an air conditioner for vehicles comprising:

a compressor;

a four-way valve having a first port connected to a discharge port of the compressor;

an exterior heat exchanger having one end thereof connected to a second port of the four-way valve;

a first expansion valve having an inlet connected to the other end of the exterior heat exchanger through a first control valve;

a first interior heat exchanger having an inlet connected to an outlet of the first expansion valve and an outlet connected to an inlet port of the compressor;

a brine/refrigerant heat exchanger having a refrigerant gas line inlet connected to a fourth port of the four-way valve and a refrigerant gas line outlet connected between the first control valve and the first expansion valve;

a second interior heat exchanger connected to a brine line of the brine/refrigerant heat exchanger through a pump; and a second expansion valve having an inlet connected between the first control valve and the first expansion valve and an outlet connected to the other end of the exterior heat exchanger, wherein:

a third port of the four-way valve is connected to said inlet port of the compressor; and a second control valve is provided at one of the refrigerant gas line inlet and outlet sides of the brine/refrigerant heat exchanger.

It is a still another object of the present invention to provide an air conditioner for vehicles comprising:

a compressor;

an exterior heat exchanger having one end port thereof connected to a discharge port of the compressor through a first control valve;

a first interior heat exchanger having one end port thereof connected to the other end port of the exterior heat exchanger through a check valve and a first expansion means, and having another end port connected to an inlet port of the compressor; and a second interior heat exchanger having one end port thereof connected to the discharge port of the compressor through a second control valve and having another end port connected between the check valve and the first expansion means, wherein:

a connection point at the other end port of the second interior heat exchanger is connected to the other end port of the exterior heat exchanger through a second expansion means; and one end port of the exterior heat exchanger is connected to the inlet port of the compressor through a third control valve.

It is a still another object of the present invention to provide an air conditioner for vehicles comprising:

a compressor;

an exterior heat exchanger having one end port thereof connected to a discharge port of the compressor through a first control valve;

a first interior heat exchanger having one end port thereof connected to another end port of the exterior heat exchanger through a check valve and a first expansion means, and having another end port connected to an inlet port of the compressor;

a brine/refrigerant heat exchanger having one refrigerant gas line end port connected to the discharge port of the compressor through a second control valve and another refrigerant gas line end port connected between the check valve and the first expansion means; and a second interior heat exchanger connected to a brine line of the brine/refrigerant heat exchanger through a pump, wherein:

a connection point at the other refrigerant gas line end port of the brine/refrigerant heat exchanger is connected to the other end port of the exterior heat exchanger through a second expansion means; and the one end port of the exterior heat exchanger is connected to the inlet port of the compressor through a third control valve.

BRIEF DESCRIPTION OF THE DRAWINGS

Other objects and advantages of the present invention will be clearly and more easily understood from preferred embodiments of the present invention which shall be explained in detail below with reference to the attached drawings, wherein.

DESCRIPTION OF THE PREFERRED EMBODIMENTS

Figure 1:
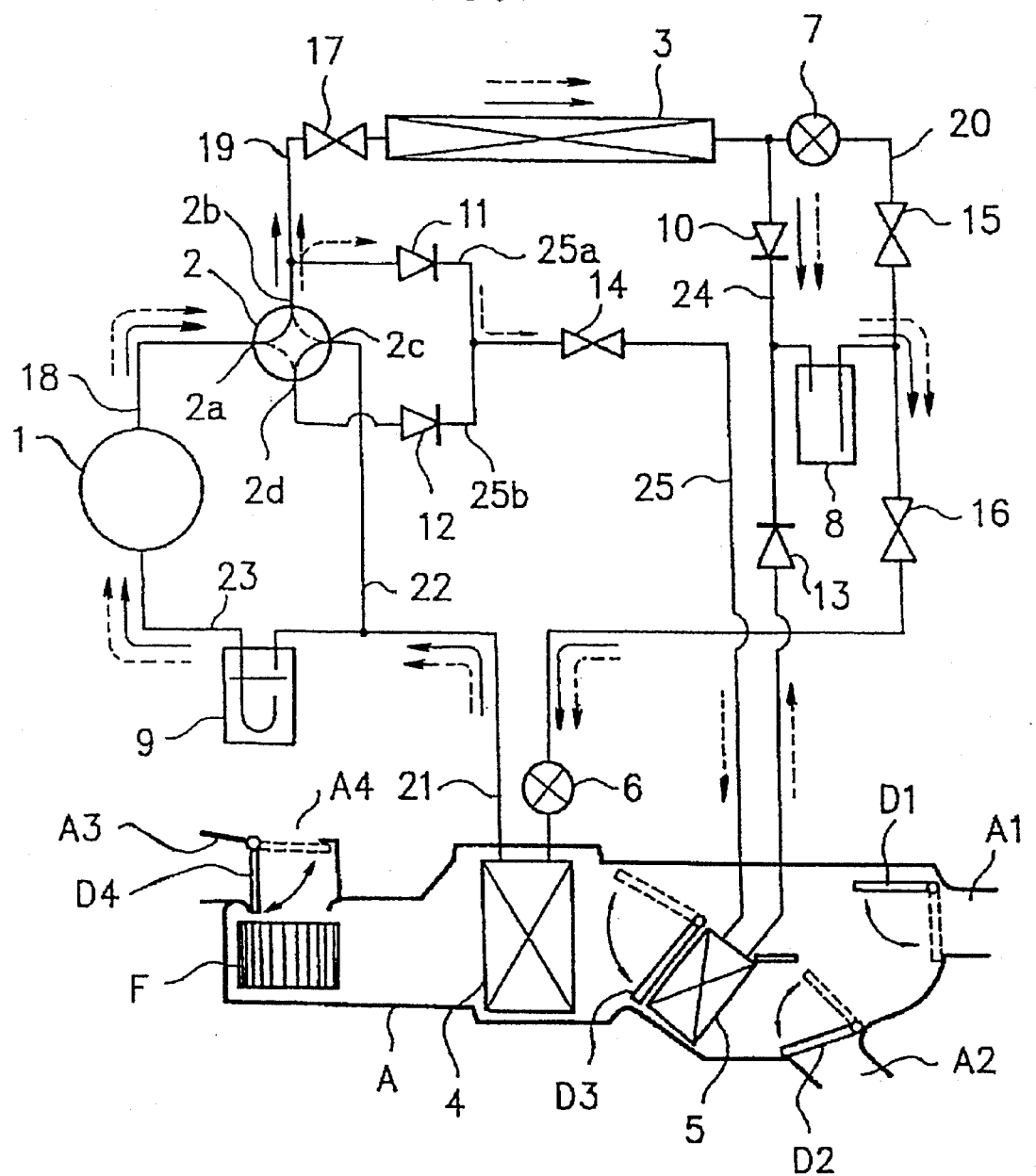
FIG. 1 is a view of a refrigerant circuit of an air conditioner for vehicles according to a first embodiment of the present invention.
Figure 2:
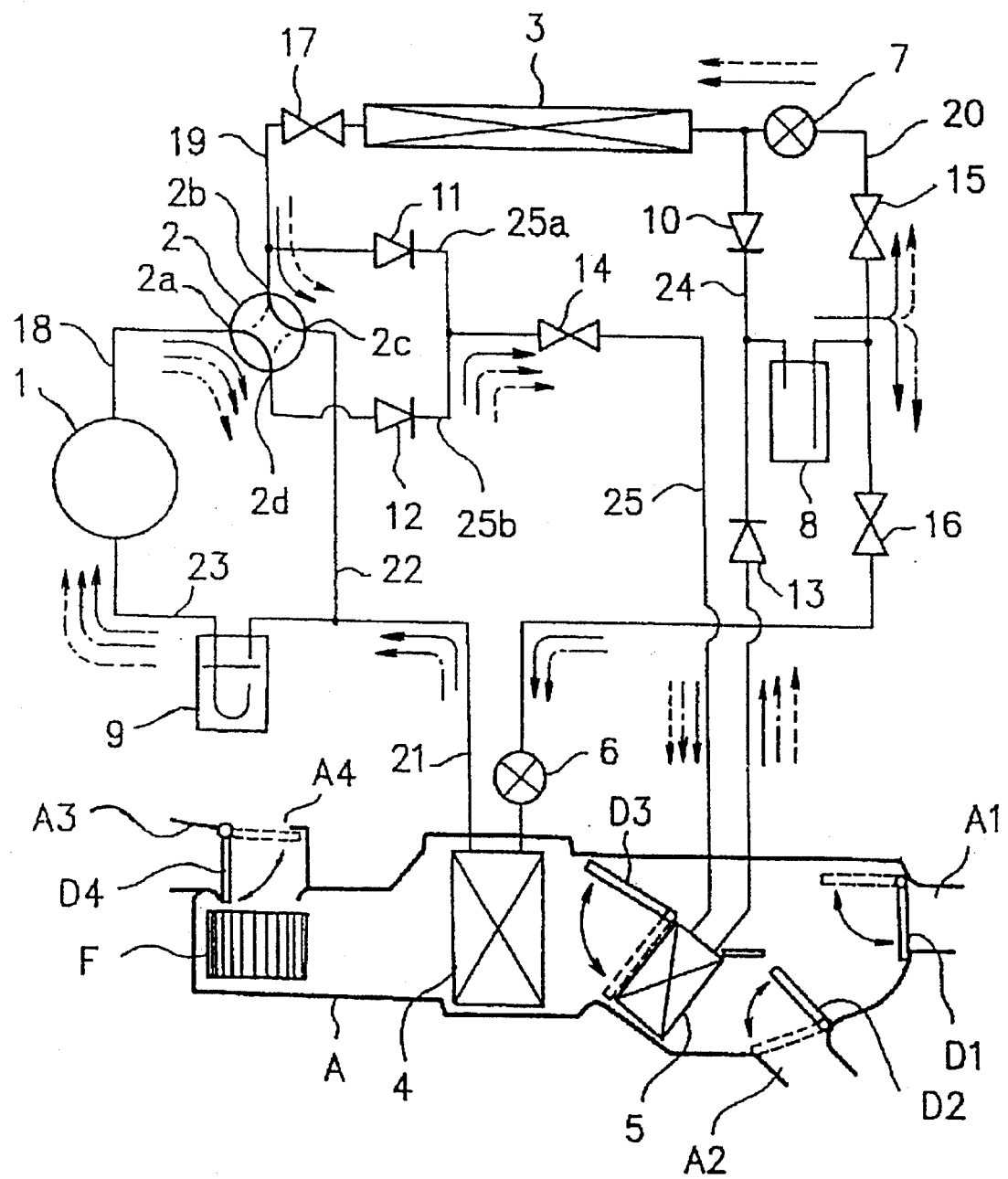
FIG. 2 is a view of the refrigerant circuit of FIG. 1 in a mode different from FIG. 1.

FIGS. 1 and 2 show a first embodiment of the present invention. In the following embodiments, the same elements will be designated by the same reference numerals, so that a detailed explanation in the subsequent embodiments may be omitted.

In the first embodiment, the discharge port from a compressor 1 is connected to a first port 2a of a four-way valve 2 through a piping line 18, and a second port 2b of the four-way valve 2 is connected to one end of an exterior heat exchanger 3 through a piping line 19 in which an ON-OFF valve: 17 is provided. The other end of the exterior heat exchanger 3 is connected to an inlet of a first interior heat exchanger 4 through a piping line 20 in which a second expansion valve 7, ON-OFF valves 15, 16 and a first expansion valve 6 are provided. An outlet of the first interior heat exchanger 4 is connected to an inlet of an accumulator 9 through a piping line 21. Further, a piping line 22 which is branched off the piping line 21 is connected to a third port 2c of the four-way valve 2, and an outlet of the accumulator 9 is connected to an inlet port of the compressor 1 through a piping line 23.

One end of a piping line 24, in which check valves 10, 13 are provided, is connected between the other end of the exterior heat exchanger 3 and the second expansion valve 7 of the piping line 20. The other end of the piping line 24 is connected to an outlet of a second interior heat exchanger 5. An inlet of a liquid receiver 8 is connected between the check valves 10 and 13 of the piping line 24, and an outlet thereof is connected between the ON-OFF valves 15 and 16 of the piping line 20, respectively. One end of a piping line 25, in which an ON-OFF valve 14 is provided, is connected to an inlet of the second interior heat exchanger 5. The other end of the piping line 25 is connected to two piping lines 25a, 25b in which oppositely directed check valves 11, 12 are provided. One piping line 25a is connected to a halfway position of the piping line 19, and the other piping line 25b is connected to a fourth port 2d of the four-way valve 2. The refrigerant gas flow direction in the second interior heat exchanger 5 can be controlled by the check valves 11, 12 in the piping lines 25a, 25b. Thus, the check valve 13 in the piping line 24 is not necessarily required in all cases. In addition, ON-OFF valve 14 may be repositioned at an outlet side of the second interior heat exchanger 5.

Dampers D1, D2 disposed in a duct A are provided for selecting one or both air discharge ports A1, A2, and are pivotably provided at the inside of each of the air discharge ports A1, A2. A damper D3 is used for adjusting the amount of ventilation provided to the second interior heat exchanger 5, and is pivotably arranged at an upstream side of the interior heat exchanger 5. A damper D4 is used for the selection of air suction ports A3, A4 (interior air and exterior air), and is pivotably arranged at the inside of both air inlet ports A3, A4. A motor-driven blower F is disposed within duct A, and operates to generate a flow of air which moves through the duct A from the left to the right in FIGS. 1, 2. Accordingly, during operation of blower F, air flows along an exterior surface of the first interior heat exchanger 4 from the left to the right in the figures.

The air conditioner can be operated in five modes: a cooling/defrosting mode, a drying/defrosting mode, a dehumidifying/heating mode (parallel), a dehumidifying/heating mode (single), and a heating mode. The modes are selected by changing over the refrigerant cycles, using the four-way valve 2 and the ON-OFF valves 14 through 17. The refrigerant cycles and functions thereof in each of the respective modes will be explained hereinafter.

In the cooling/defrosting mode, the compressor 1 is operated in a state in which the four-way valve 2 is set to the position indicated by the solid line in FIG. 1, the ON-OFF valves 14, 15 are closed, and the ON-OFF valves 16, 17 are opera. As shown by the solid line arrows in this figure, the refrigerant gas that is discharged from the compressor 1 flows into the exterior heat exchanger 3 and is condensed, and thereafter flows into the first expansion valve 6 and the first interior heat exchanger 4 through the liquid receiver 8 and is evaporated. The refrigerant is then introduced into the compressor 1 through the accumulator 9. Cooling in the vehicle cabin can be performed using this refrigerant cycle in a cooling/defrosting mode by performing a heat absorbing operation in the first interior heat exchanger 4. Further, a heat radiating operation performed in the exterior heat exchanger 3 can be utilized to carry out rapid defrosting of the heat exchanger 3.

In the drying/defrosting mode, the compressor 1 is operated in a state in which the four-way valve 2 is set to the position indicated by the solid line in FIG. 1, the ON-OFF valve 15 is closed, and the ON-OFF valves 14, 16, 17 are open. As shown by the broken line arrows in this figure, a portion of the refrigerant gas that is discharged from the compressor 1 flows into the exterior heat exchanger 3 and is condensed. Thereafter, the refrigerant flows into the first expansion valve 6 and the first interior heat exchanger 4 through the liquid receiver 8 and is evaporated, and is then introduced into the compressor 1 through the accumulator 9. The residual part of the refrigerant gas flows into the second interior heat exchanger 5 and is condensed, and is then mixed with the aforementioned refrigerant before reaching the liquid receiver 8. Thus, in this refrigerant cycle, dehumidification in the vehicle cabin can be performed without lowering the air blowing temperature, by respectively performing a heat absorbing action in the first interior heat exchanger 4, and a heat radiating action in the second interior heat exchanger 5. The temperature and amount of dehumidification in the drying mode can be controlled by adjusting the discharge ability of the compressor 1 and the degree of opening of the damper D3. Further, defrosting of the exterior heat exchanger 3 can be performed by utilizing a heat radiating action of the exterior heat exchanger 3, and lowering of the air blowing temperature is prevented during defrosting.

In the (parallel) dehumidifying/heating mode, the compressor 1 is operated in a state in which the four-way valve 2 is set to the position indicated by the solid line in FIG. 2, and the ON-OFF valves 14, 15, 16, 17 are open. As shown by the solid line arrows in this figure, the refrigerant gas that is discharged from the compressor 1 flows into the second interior heat exchanger 5 and is condensed, and thereafter branches into two flows after passing through the liquid receiver 8. A portion of the refrigerant gas flows into the second expansion valve 7 and the exterior heat exchanger 3 and is evaporated, and is then introduced into the compressor 1 through the accumulator 9. The residual part of the refrigerant flows into the first expansion valve 6 and the first interior heat exchanger 4 and is evaporated, and is then mixed with the aforementioned refrigerant gas before reaching the accumulator 9. Accordingly, heating and dehumidification in the vehicle cabin can be simultaneously performed in the dehumidifying/heating mode (parallel refrigerant cycle by performing heat absorption in the exterior heat exchanger 3, and respectively performing a heat radiating operation in the second interior heat exchanger 5 and a heat absorbing operation in the first interior heat exchanger 4. The heating ability and the amount of dehumidification during operation in this mode can be controlled by adjusting the discharge ability of the compressor 1 and the degree of opening of the damper D3.

In the (single) dehumidifying/heating mode, the compressor 1 is operated in a state in which the four-way valve 2 is set to the position shown by the solid line in FIG. 2, the ON-OFF valves 15, 17 are closed, and the ON-OFF valves 14, 16 are open. As shown by the dashed line arrows in this figure, the refrigerant gas that is discharged from the compressor 1 flows into the second interior heat exchanger 5 and is condensed, and then flows into the first expansion valve 6 and the first interior heat exchanger 4 through the liquid receiver 8 and is evaporated. Thereafter, the refrigerant flows into the compressor 1 through the accumulator 9. Accordingly, heating and dehumidification in the vehicle cabin can be simultaneously performed in the dehumidifying/heating mode (single) refrigerant cycle by respectively performing a heat radiating operation in the second interior heat exchanger 5 and a heat absorbing operation in the first interior heat exchanger 4. The heating ability and amount of dehumidification during operation in this mode can be controlled by adjusting the discharge ability of the compressor 1 and the opening angle of the damper D3.

Operation of the heating mode is performed by operating the compressor 1 in a state in which the four-way valve 2 is set to the position shown by the solid line in FIG. 2, the ON-OFF valve 16 is closed, and the ON-OFF valves 14, 15, 17 are open. As shown by the broken line arrows in this figure, the refrigerant gas that is discharged from the compressor 1 flows into the second interior heat exchanger 5 and is condensed, then the refrigerant flows into the second expansion valve 7 and the exterior heat exchanger 3 through the liquid receiver 8 and is evaporated, and thereafter is introduced into the compressor 1 through the accumulator 9. Accordingly, heating in the vehicle cabin can be performed in the heating mode refrigerant cycle by performing a heat radiating operation in the second interior heat exchanger 5. The heating ability during operation in this mode can be controlled by adjusting the discharge ability of the compressor 1 and the opening angle of the damper D3.

As described above, according to the first embodiment, operation of the air conditioner in five modes is possible due to the changeover of the refrigerant cycle by using the four-way valve 2 and the ON-OFF valves 14 through 17. An advantage results in that air-conditioning can be performed, preferably in vehicles such as electric automobiles which have no internal heat source such as an internal combustion engine.

Further, the air blowing temperature is adjustable by controlling the heat radiation at the second interior heat exchanger 5 during the drying/defrosting mode. Thus, cold air is not blown into the vehicle cabin during drying or defrosting.

Further, heating of the vehicle cabin can be performed while simultaneously performing dehumidification during operation of the two dehumidifying/heating modes. Thus, no lack of visibility occurs on the window glass even during situations of high humidity such as rain or snow, and comfortable heating can be realized without hampering visibility upon changeover from the cooling stage to the heating stage.

Further, heat absorbing functions are performed in both the exterior heat exchanger 3 and the first interior heat exchanger 4 during operation of the (parallel) dehumidifying/heating mode. Thus, inefficiency in the heating operation can be prevented by suppressing frosting on the exterior heat exchanger 3 when performing the heating operation in cold environments.

The air conditioner shown in the first embodiment also is capable of operating in two modes, namely, a drying/defrosting mode and a (parallel) dehumidifying/heating mode, by employing a changeover means in the refrigerant cycle comprising only the four-way valve 2 with the ON-OFF valves 14, 15 and 16 removed from the air conditioning circuit. Both cooling and drying operations can be selected in the drying/defrosting mode by adjusting the amount of ventilation to the second interior heat exchanger 5 by using the damper D3, and lowering of the air blowing temperature can be also prevented during defrosting. Further, the amount of refrigerant gas flowing to the exterior heat exchanger 3 and the second interior heat exchanger 5 can be also adjusted by controlling the ON-OFF valve 17.

If the ON-OFF valves 14, 15, 17 are removed from the circuit while maintaining only the ON-OFF valve 16, three modes of operation can be performed, including the two modes described above, and further including a heating mode in the same manner as in the first embodiment by changing over the refrigerant cycle using the four-way valve 2 and the ON-OFF valve 16.

If the ON-OFF valves 14, 16, 17 are removed from the circuit while maintaining only the ON-OFF valve 15, three modes of operation can be performed, including the two modes described above, and further including a (single) dehumidifying/heating mode in the same manner as in the first embodiment by changing over the refrigerant cycle by using the four-way valve 2 and the ON-OFF valve 15.

If the ON-OFF valves 15, 16, 17 are removed while maintaining only the ON-OFF valve 14, three modes of operation can be performed, including the two modes described above, and further including a cooling/defrosting mode in the same manner as in the first embodiment by changing over the refrigerant cycle by using the four-way valve 2 and the ON-OFF valve 14.

If the ON-OFF valves 14, 15, 16 are removed while maintaining only the ON-OFF valve 17, two modes of operations can be performed, including the drying/defrosting mode described above and an added (single) dehumidifying/heating mode in the same manner as in the first embodiment, by changing over the refrigerant cycle by using the four-way valve 2 and the ON-OFF valve 17.

In addition, only one or more necessary models can be selected and set from among the five operating modes of the air conditioner described above by suitably selecting two or three of the ON-OFF valves 14 through 17.

Figure 3:
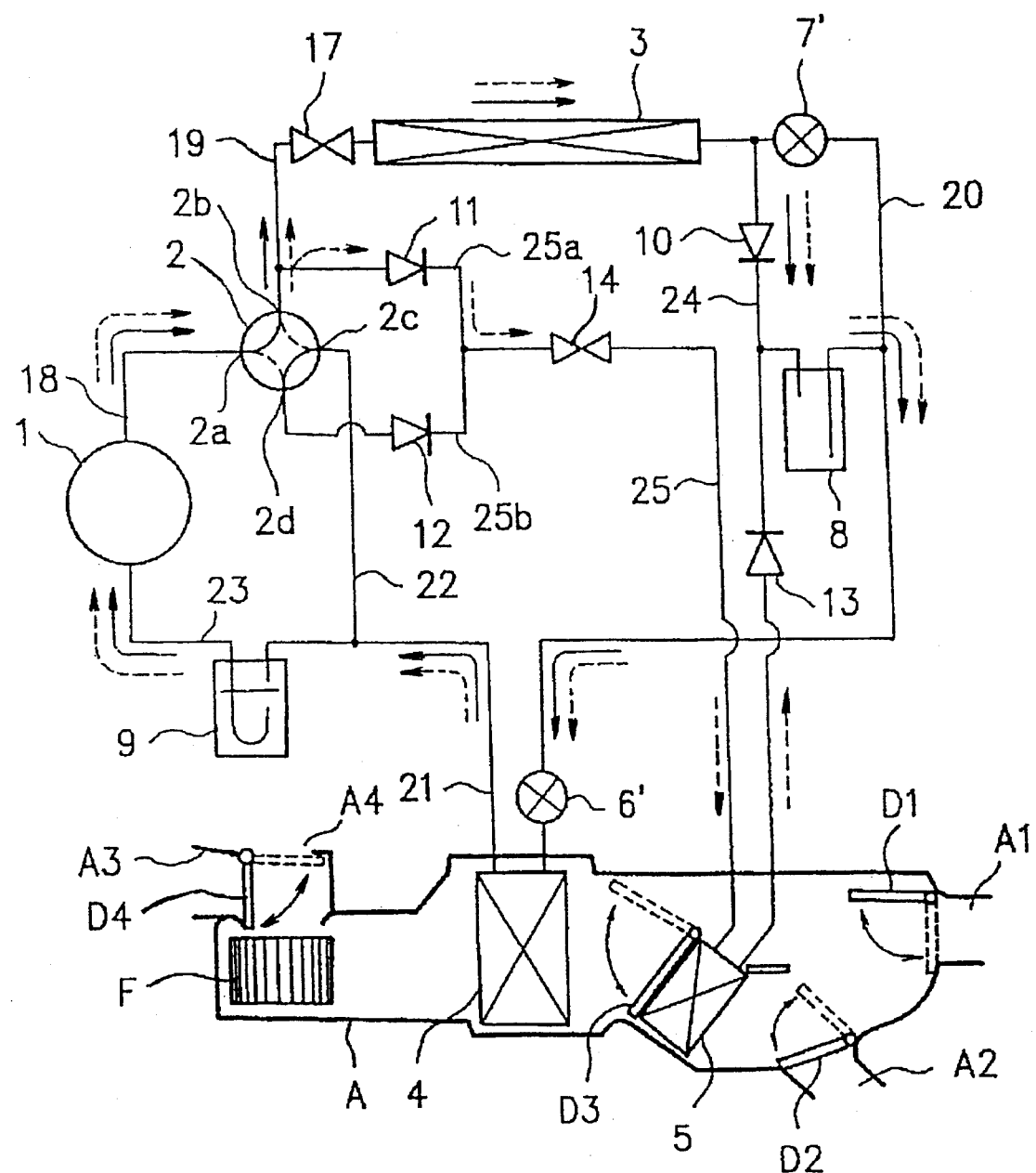
FIG. 3 is a view of the refrigerant circuit of an air conditioner for vehicles according to a second embodiment of the present invention.
Figure 4:
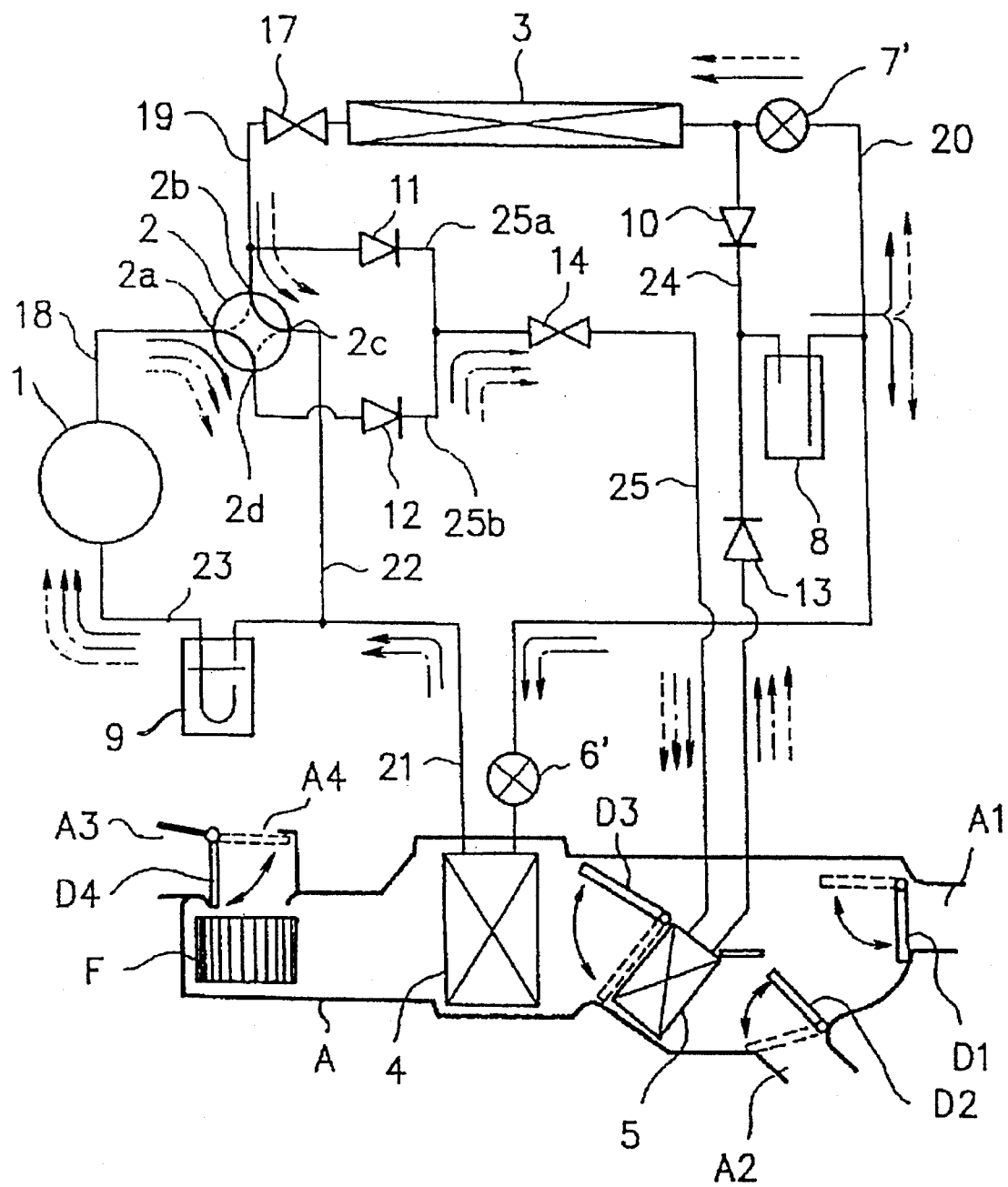
FIG. 4 is a view of the refrigerant circuit of FIG. 3 in a mode different from FIG. 3.

FIGS. 3 and 4 show a second embodiment of the present invention. The second embodiment is a simplified configuration of the air conditioner of the first embodiment. This embodiment differs from the first embodiment in that the ON-OFF valves 15, 16 are removed from the piping line 20, and remote control electronic devices (6', 7') for performing opening and closing operations are used in the first and second expansion valves. The degree of opening of both expansion valves 6', 7' is controlled based on the temperature of the refrigerant gas discharged from the heat exchanger in a thermosensitive manner. In the same manner as in the first embodiment, the check valve 13 in the piping line 24 is not necessarily required, and the position of the ON-OFF valve 14 may be at the side of the outlet of the second interior heat exchanger 5 Other details of the apparatus are the same as (that of] in the first embodiment. Thus, the same reference numerals are adopted and detail explanation of these details is omitted.

The air conditioner of FIGS. 3 and 4 can be operated in five modes, including a cooling/defrosting mode, a drying/defrosting mode, a (parallel) dehumidifying/heating mode, a (single) dehumidifying/heating mode, and a heating mode, by changing over the refrigerant cycles by using the four-way valve 2, the first and second expansion valves 6', 7' and the ON-OFF valves 14, 17. The refrigerant cycle and function in each of these modes will be explained below.

The cooling/defrosting mode is performed by operating the compressor 1 in a state in which the four-way valve 2 is set to the position shown by the solid line in FIG. 3, the second expansion valve 7' and the ON-OFF valve 14 are closed, and the ON-OFF valve 17 is open. As shown by the solid line arrows in this figure, the refrigerant gas that is discharged from the compressor 1 flows into the exterior heat exchanger 3 and is condensed, then flows into the first expansion valve 6' and the first interior heat exchanger 4 through the liquid receiver 8 and is evaporated, and thereafter is introduced into the compressor 1 through the accumulator 9. Accordingly, cooling of the vehicle cabin can be performed in this refrigerant cycle by a heat absorbing operation in the first interior heat exchanger 4. Further, a heat radiating action at the exterior heat exchanger 3 can be utilized to rapidly perform defrosting.

Operation in the drying/defrosting mode is performed by operating the compressor 1 in a state in which the four-way valve 2 is set to the position shown by the solid line in FIG. 3, the second expansion valve 7' is closed, and the ON-OFF valves 14, 17 are open. As shown by the broken line arrows in this figure, a portion of the refrigerant gas that is discharged from the compressor 1 flows into the exterior heat exchanger 3 and is condensed, then flows into the first expansion valve 6' and the first interior heat exchanger 4 through the liquid receiver 8 and is evaporated, and thereafter flows into the compressor 1 through the accumulator 9. The residual portion of the refrigerant flows into the second interior heat exchanger 5 and is condensed, and is then mixed with the aforementioned refrigerant gas before reaching the liquid receiver 8. Accordingly, dehumidification of the vehicle cabin can be performed without lowering the air blowing temperature in this refrigerant cycle by respectively performing a heat absorbing action in the first interior heat exchanger 4, and a heat radiating action in the second interior heat exchanger 5. The temperature and amount of dehumidifying during drying can be controlled by adjusting the discharge ability of the compressor 1 and the degree of opening of the damper D3. Further, defrosting of the exterior heat exchanger 3 can be performed by utilizing heat radiation generated at the exterior heat exchanger 3, and lowering of the air blowing temperature can be also prevented during defrosting.

Operation in the (parallel) dehumidifying/heating mode is performed by operating the compressor 1 in a state in which the four-way valve 2 is set to the position shown by the solid line in FIG. 4, and the ON-OFF valves 14, 17 are open. As shown by the solid line arrows in this figure, the refrigerant gas that is discharged from the compressor 1 flows into the second interior heat exchanger 5 and is condensed, and then is branched into two flows after passing through the liquid receiver 8. A portion of the refrigerant flows into the second expansion valve 7' and the exterior heat exchanger 3 and is evaporated, and is then led into the compressor 1 through the accumulator 9. The residual part of the refrigerant flows into the first expansion valve 6' and the first interior heat exchanger 4 and is evaporated, and is then mixed with the aforementioned refrigerant gas before reaching the accumulator 9. Accordingly, heating and dehumidification of the vehicle cabin can be simultaneously performed in this refrigerant cycle by performing a heat absorbing action in the exterior heat exchanger 3 and respectively performing a heat radiating action in the second interior heat exchanger 5 and a heat absorbing action in the first interior heat exchanger 4. The heating operation and amount of dehumidification during operation in this mode can be controlled by adjusting the discharge ability of the compressor 1 and the opening angle of the damper D3.

The Operation in the (single) dehumidifying/heating mode is performed by operating the compressor 1 in a state in which the four-way valve 2 is set to the position shown by the solid line in FIG. 4, the second expansion valve 7' and the ON-OFF valve 17 are closed, and the ON-OFF valve 14 is open. As shown by the dashed line arrows in this figure, the refrigerant gas that is discharged from the compressor 1 flows into the second interior heat exchanger 5 and is condensed, then flows into the first expansion valve 6' and the first interior heat exchanger 4 through the liquid receiver 8 and is evaporated, and thereafter flows into the compressor 1 through the accumulator 9. Accordingly, heating and dehumidification of the vehicle cabin can be simultaneously performed in this refrigerant cycle by respectively performing a heat radiating operation in the second interior heat exchanger 5 and a heat absorbing operation in the first interior heat exchanger 4. The heating ability and amount of dehumidification during operation in this mode can be controlled by adjusting the discharge ability of the compressor 1 and the degree of opening of the damper D3.

Operation in the heating mode is performed by operating the compressor 1 in a state in which the four-way valve 2 is set to the position shown by the solid line in FIG. 4, the first expansion valve 6' is closed, and the ON-OFF valves 14, 17 are open. As shown by the broken line arrows in this figure, the refrigerant gas that is discharged from the compressor 1 flows into the second interior heat exchanger 5 and is condensed, then flows into the second expansion valve 7' and the exterior heat exchanger 3 through the liquid receiver 8 and is evaporated, and thereafter flows into the compressor 1 through the accumulator 9. Accordingly, heating of the vehicle cabin can be performed in this refrigerant cycle by performing a heat radiating action in the second interior heat exchanger 5. The heating ability during operation in this mode can be controlled by adjusting the discharge ability of the compressor 1 and the opening angle of the damper D3.

As described above, in the air conditioner of the second embodiment, operations in five modes are possible due to the changeover of the refrigerant cycle by using the four-way valve 2, the first and second expansion valves 6', 7' and the ON-OFF valves 14, 17. An advantage results in that air-conditioning can be performed in vehicles such as electric automobiles which have no internal heat source such as an internal combustion engine. Further, the air conditioning circuit can be simplified by replacing both of the ON-OFF valves 15, 16 in the air conditioner of the first embodiment with expansion valves 6', 7'. Other advantages are the same as those of the first embodiment.

The air conditioner of the second embodiment also is capable of operating in four modes, including a drying/defrosting mode, a (parallel) dehumidifying/heating mode, a (single) dehumidifying/heating mode and a heating mode in the same manner as described above by changing over the refrigerant cycle by using the four-way type valve 2 and the first and second expansion valves 6', 7' even in the case where the ON-OFF valves 14, 15 and 16 are removed from the air conditioning circuit. Cooling and drying operations can be selected in the drying/defrosting mode by adjusting the amount of ventilation to the second interior heat exchanger 5 by using the damper D3, and lowering of the air blowing temperature can be also prevented during defrosting. Further, the amount of refrigerant gas flow to the exterior heat exchanger 3 and the second interior heat exchanger 5 can also be adjusted by controlling the ON-OFF valve 17.

If the ON-OFF valve 17 is removed from the circuit while maintaining only the ON-OFF valve 14, operations can be performed in five modes in the same manner as in the second embodiment by changing over the refrigerant cycle by using the four-way valve 2, the first and second expansion valves 6', 7' and the ON-OFF valve 14.

If the ON-OFF valve 14 is removed from the circuit while maintaining only the ON-OFF valve 17, operations can be performed in four modes, including a drying/defrosting mode, a (parallel) dehumidifying/heating mode, a (single) dehumidifying/heating mode, and a heating mode in the same manner as in the second embodiment by changing over the refrigerant cycle by using the four-way valve 2, the first and second expansion valves 6', 7' and the ON-OFF valve 17.

Figure 5:
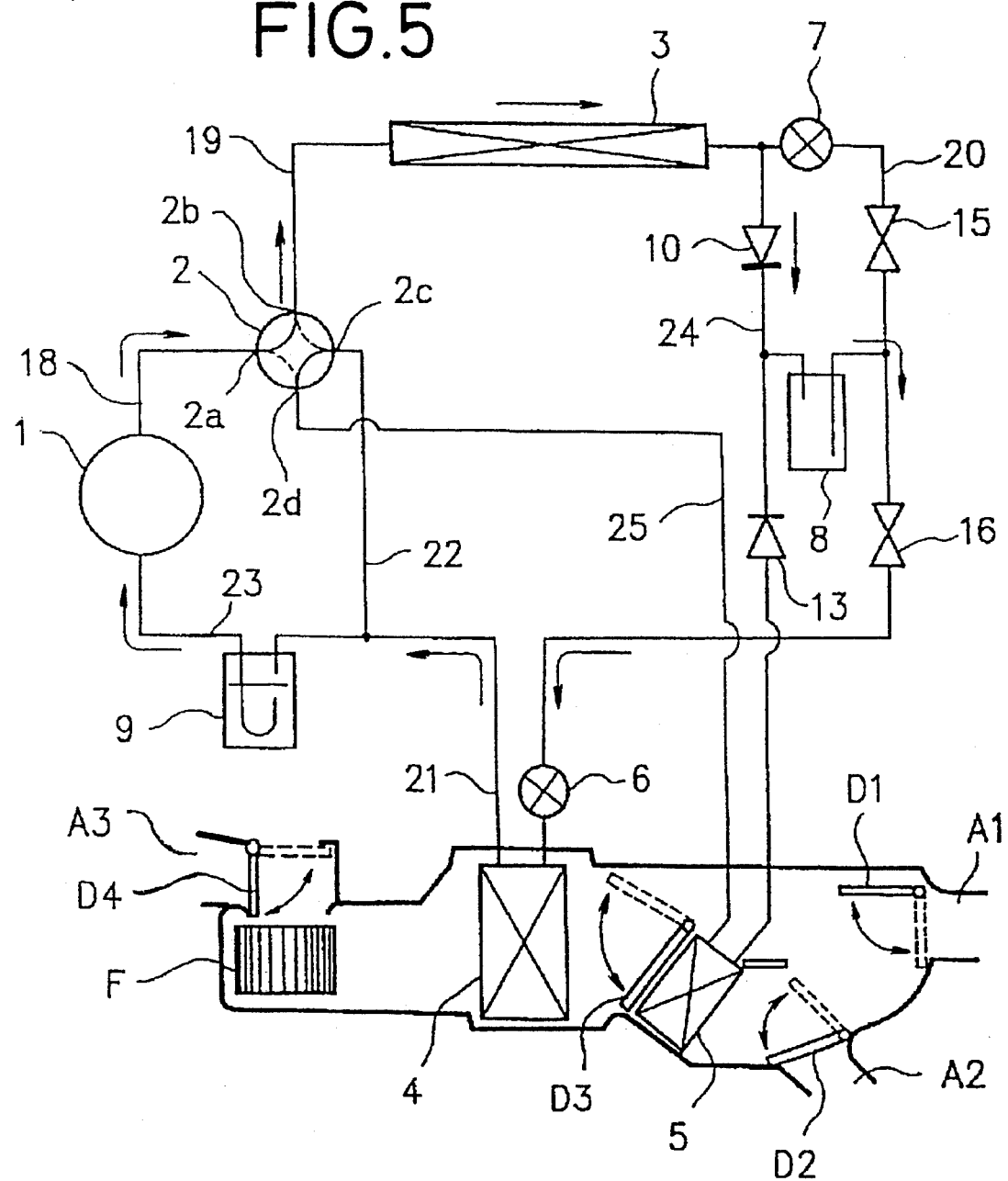
FIG. 5 is a view of a refrigerant circuit of an air conditioner for vehicles according to a third embodiment of the present invention.
Figure 6:
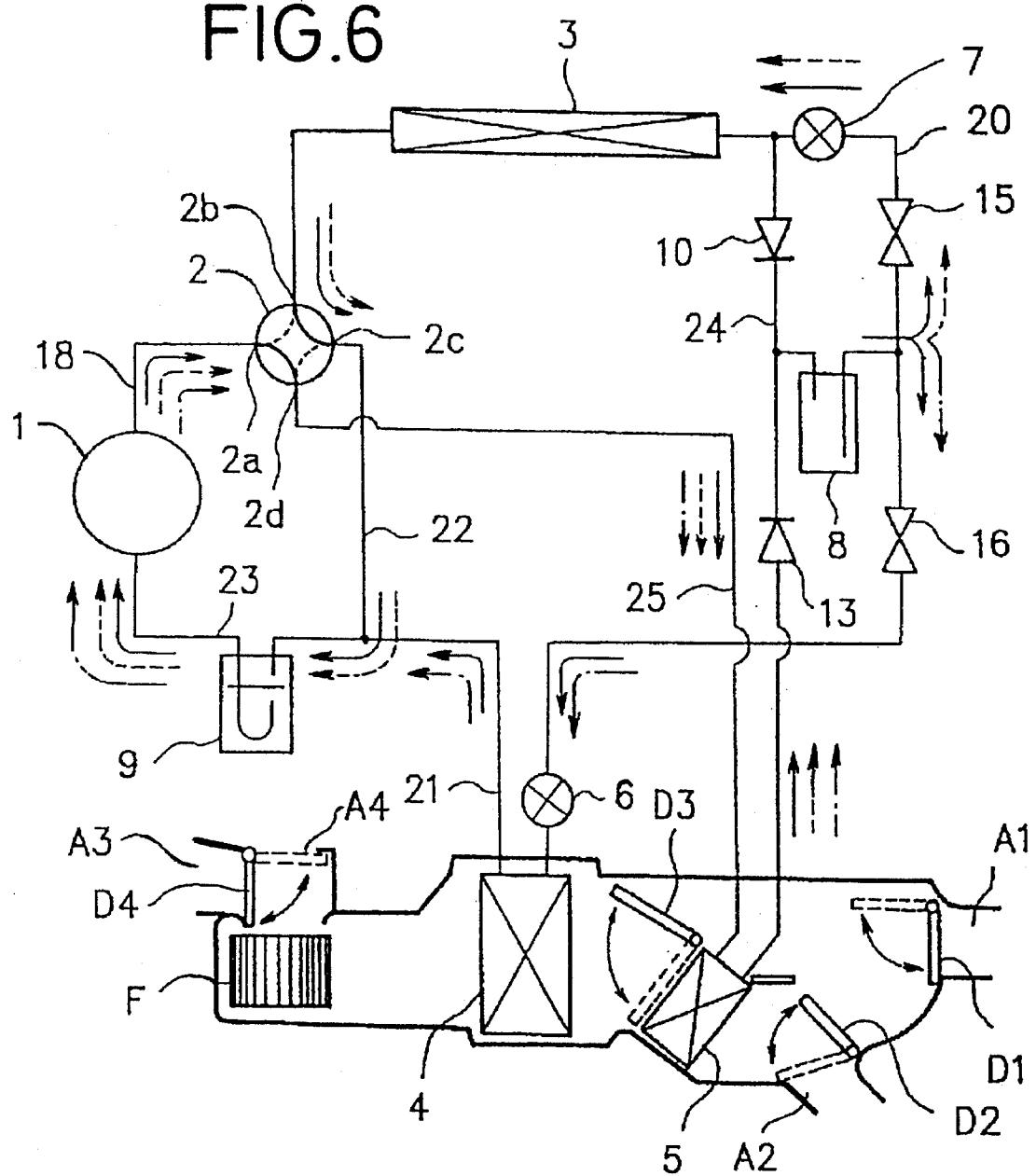
FIG. 6 is a view of the refrigerant circuit of FIG. 5 in a mode different from FIG. 5.

FIGS. 5 and 6 show a third embodiment of the present invention. The third embodiment is likewise a simplified construction of the air conditioner of the first embodiment. The third embodiment differs from the first embodiment in that the ON-OFF valve 17 is removed from the piping line 19, the check valves 11, 12 and piping lines 25a, 25b are removed, the ON-OFF valve 14 is removed from the piping line 25, and the piping line 25 is connected to the fourth port 2d of the four-way valve 2. The check valve 13 for controlling the refrigerant gas flow direction in the second interior heat exchanger 5 may be provided at the side of the piping line 25. Other details are the same as those of the first embodiment. Thus, the same reference numerals are used and detailed explanation of such common features is omitted.

The air conditioner can be operated in four modes, including cooling/defrosting mode, a (parallel) dehumidifying/heating mode, a (single) dehumidifying/heating mode, and a heating mode by changing over refrigerant cycles by using the four-way valve 2 and the ON-OFF valves 15, 16. The refrigerant cycles and functions in each of these modes will be explained below.

The cooling/defrosting mode is performed by operating the compressor 1 in a state in which the four-way valve 2 is set to the position shown by the solid line in FIG. 5, the ON-OFF valve 15 is closed, and the ON-OFF valve 16 is open. As shown by the solid line arrows in this figure, the refrigerant gas that is discharged from the compressor 1 flows into the exterior heat exchanger 3 and is condensed, then flows into the first expansion valve 6 and the first interior heat exchanger 4 through the liquid receiver 8 and is evaporated, and thereafter flows into the compressor 1 through the accumulator 9. Accordingly, cooling of the vehicle cabin can be performed in this refrigerant cycle by performing heat absorption in the first interior heat exchanger 4. Further, a heat radiating operation performed in the exterior heat exchanger 3 can be utilized to perform rapid defrosting.

Operation in the (parallel) dehumidifying/heating mode is performed by operating the compressor 1 in a state in which the four-way valve 2 is set to the position shown by the solid line in FIG. 6, and the ON-OFF valves 15, 16 are open. As shown by the solid line arrows in this figure, the refrigerant gas that is discharged from the compressor 1 flows into the second interior heat exchanger 5 and is condensed, and then branches into two flows after passing through the liquid receiver 8. A portion of the refrigerant flows into the second expansion valve 7 and the exterior heat exchanger 3 and is evaporated, and is then introduced into the compressor 1 through the accumulator 9. The residual portion of the refrigerant gas flows into the first expansion valve 6 and the first interior heat exchanger 4 and is evaporated, and is then mixed with the other branched refrigerant before reaching the accumulator 9. Accordingly, heating and dehumidification of the vehicle cabin can be simultaneously performed in this refrigerant cycle by performing heat absorption in the exterior heat exchanger 3, and respectively performing a heat radiating action in the second interior heat exchanger 5 and a heat absorbing action in the first interior heat exchanger 4. The heating ability and amount of dehumidification during operation in this mode can be controlled by adjusting the discharge ability of the compressor 1 and the degree of opening of the damper D3.

Operation in the (single) dehumidifying/heating mode is performed by operating the compressor 1 in a state in which the four-way valve 2 is set to the position shown by the solid line in FIG. 6, the ON-OFF valve 15 is closed, and the ON-OFF valve 16 is open. As shown by the dashed line arrows in this figure, the refrigerant gas that is discharged from the compressor 1 flows into the second interior heat exchanger 5 and is condensed, then flows into the first expansion valve 6 and the first interior heat exchanger 4 through the liquid receiver 8 and is evaporated, and thereafter flows into the compressor 1 through the accumulator 9. Accordingly, heating and dehumidification of the vehicle cabin can be simultaneously performed in this refrigerant cycle by respectively performing a heat radiating action in the second interior heat exchanger 5 and a heat absorbing action in the first interior heat exchanger 4. The heating ability and amount of dehumidification during operation in this mode can be controlled by adjusting the discharge ability of the compressor 1 and the degree of opening of the damper D3.

Operation in the heating mode is performed by operating the compressor 1 in a state in which the four-way valve 2 is set to the position shown by the solid line in FIG. 6, the ON-OFF valve 16 is closed, and the ON-OFF valve 15 is open. As shown by the broken line arrows in this figure, the refrigerant gas that is discharged from the compressor 1 flows into the second interior heat exchanger 5 and is condensed, then flows into the second expansion valve 7 and the exterior heat exchanger 3 through the liquid receiver 8 and is evaporated, and thereafter is introduced into the compressor 1 through the accumulator 9. Accordingly, heating in the vehicle cabin can be performed in this refrigerant cycle by performing a heat radiating action in the second interior heat exchanger 5. The heating ability during the operation in this mode can be controlled by adjusting the discharge ability of the compressor 1 and the degree of opening of the damper D3.

As described above, in the air conditioner of the third embodiment, operations in four modes are provided due to the changeover of the refrigerant cycle by using the four-way valve 2 and the ON-OFF valves 15, 16. An advantage results in that air-conditioning can be performed in vehicles such as electric automobiles which have no internal heat source such as an internal combustion engine. Other effects are the same as those of the first embodiment.

The air conditioner of the third embodiment also is capable of operating in two modes, including a cooling/defrosting mode and a (parallel) dehumidifying/heating mode in the same manner as in the third embodiment by means of changeover of the refrigerant cycle using the four-way valve 2, even if both of the ON-OFF valves 15, 16 are removed from the air conditioning circuit.

If the ON-OFF valve 15 is removed while maintaining only the ON-OFF valve 16, operations can be performed in three modes including the two modes described above and further including a heating mode, in the same manner as in the third embodiment by means of changeover of the refrigerant cycle by using the four-way valve 2 and the ON-OFF valve 16.

If the ON-OFF valve 16 is removed while maintaining only the ON-OFF valve 15, operations can be performed in three modes, including the two modes described above and further including a (single) dehumidifying/heating mode in the same manner as in the first embodiment by means of changeover of the refrigerant cycle by using the four-way valve 2 and the ON-OFF valve 15.

Figure 7:
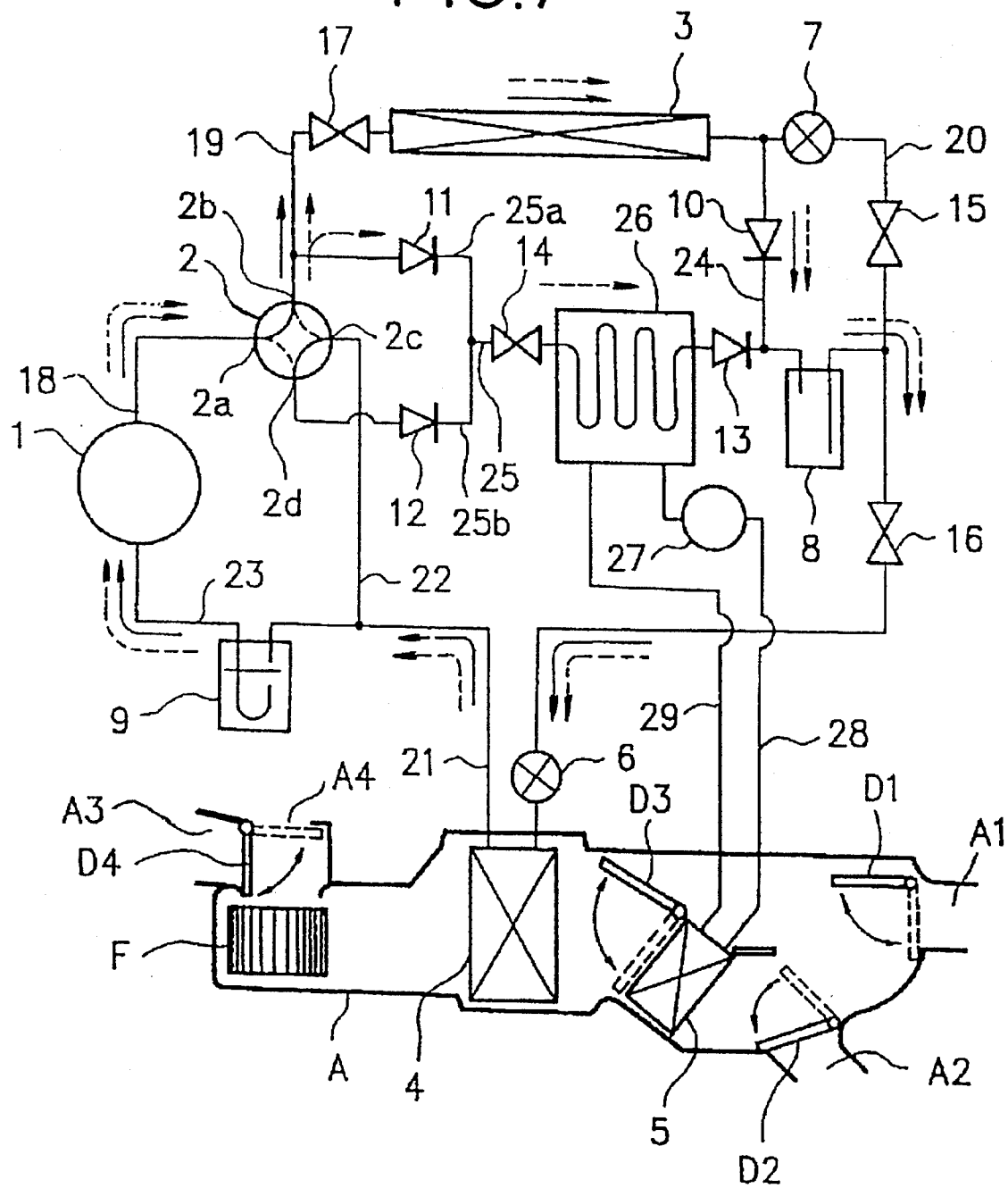
FIG. 7 is a view of a refrigerant circuit of an air conditioner for vehicles according to a fourth embodiment of the present invention.
Figure 8:
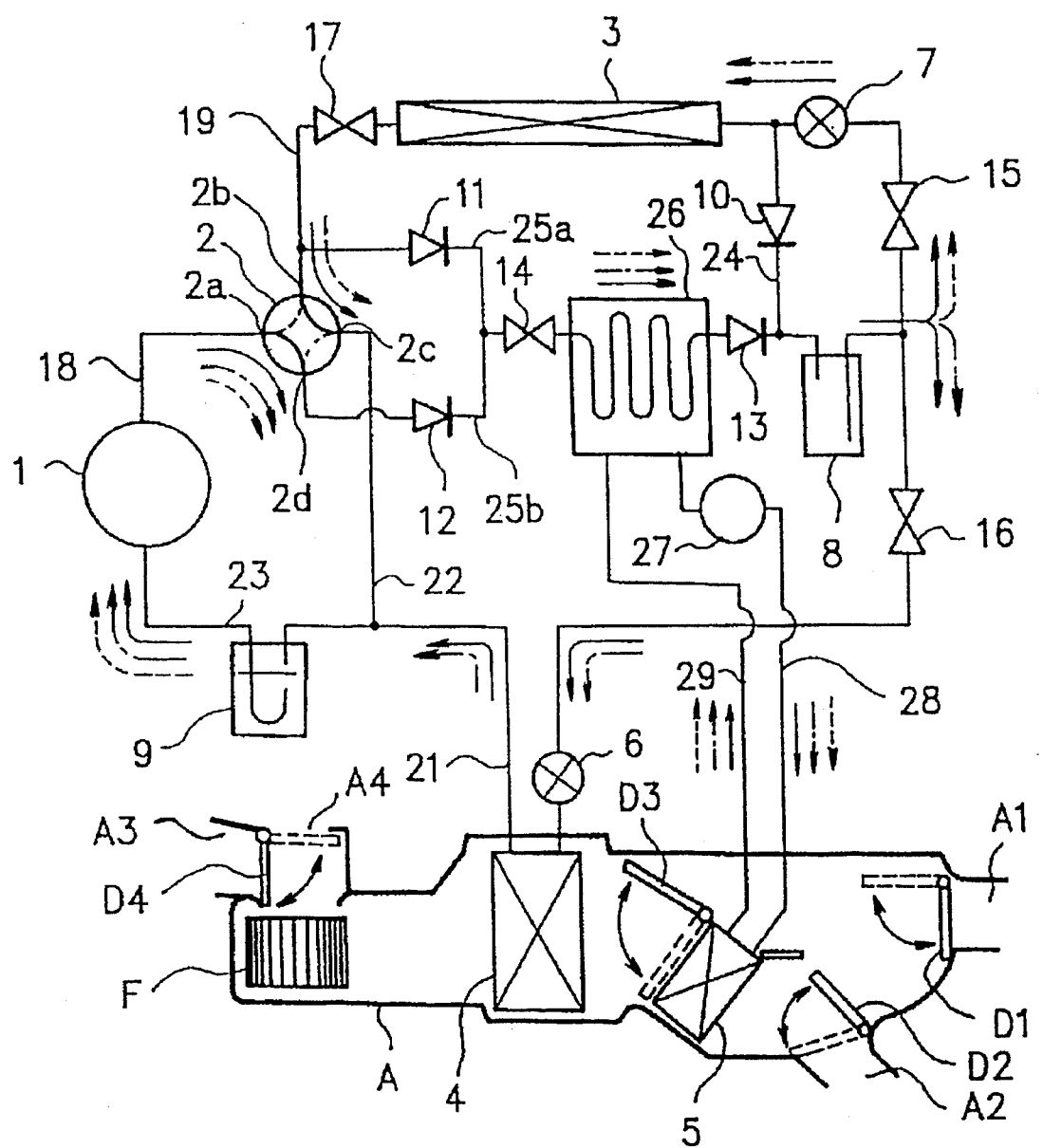
FIG. 8 is a view of the refrigerant circuit of FIG. 7 in a mode different from FIG. 7.

FIGS. 7 and 8 show a fourth embodiment of the present invention. The fourth embodiment utilizes a brine/refrigerant heat exchanger in the air conditioner of the first embodiment, but also differs from the first embodiment in that the piping lines 24, 25 are separated from the second interior heat exchanger 5, and a refrigerant line of a brine/refrigerant heat exchanger (hereinafter simply referred to as the brine heat exchanger) 26 is connected between both piping lines. Further, one end of the brine line of the brine heat exchanger 26 is connected to one end of the second interior heat exchanger 5 through a piping line 28 in which an electromotive pump 27 is provided, and the other end of the brine line of the brine heat exchanger 26 is connected to the other end of the second interior heat exchanger 5 through a piping line 29.

In the same manner as in the first embodiment, the check valve 13 at the side of the piping line 24 is not necessarily required, and the position of insertion of the ON-OFF valve 14 may be at the outlet side of the refrigerant line of the brine heat exchanger 26. Other features and details are the same as those of the first embodiment. Thus, the same reference numerals are used and detailed explanation of such features is omitted.

The air conditioner can be operated in five modes, including a cooling/defrosting mode, a drying/defrosting mode, a (parallel) dehumidifying/heating mode, a (single) dehumidifying/heating mode, and a heating mode by means of changeover of refrigerant cycles by using the four-way valve 2 and the ON-OFF valves 14 through 17. The refrigerant cycles and functions in each of these modes will be explained below.

Operation in the cooling/defrosting mode is performed by operating the compressor 1 in a state in which the four-way valve 2 is set to the position shown by the solid line in FIG. 7, the ON-OFF valves 14, 15 are closed, and the ON-OFF valves 16, 17 are open. As shown by the solid line arrows in this figure, the refrigerant gas that is discharged from the compressor 1 flows into the exterior heat exchanger 3 and is condensed, then flows into the first expansion valve 6 and the first interior heat exchanger 4 through the liquid receiver 8 and is evaporated, and thereafter flows into the compressor 1 through the accumulator 9. Accordingly, cooling in the vehicle cabin can be performed in this refrigerant cycle by performing a heat absorbing operation in the first interior heat exchanger 4. Further, heat radiation generated in the exterior heat exchanger 3 can be utilized to perform rapid defrosting of the heat exchanger 3.

Operation in the drying/defrosting mode is performed by operating the compressor 1 and the pump 27 in a state in which the four-way valve 2 is set to the position shown by the solid line in FIG. 7, the ON-OFF valve 15 is closed, and the ON-OFF valves 14, 16, 17 are open. As shown by the broken line arrows in this figure, a portion of the refrigerant gas that is discharged from the compressor 1 flows into the exterior heat exchanger 3 and is condensed, then flows into the first expansion valve 6 and the first interior heat exchanger 4 through the liquid receiver 8 and is evaporated, and thereafter is led into the compressor 1 through the accumulator 9. The residual part of the refrigerant gas flows into the brine heat exchanger 26 and is heat-exchanged with brine to heat the brine, and it is then mixed with the aforementioned refrigerant before reaching the liquid receiver 8. The heated brine circulates between the brine heat exchanger 27 and the second interior heat exchanger 5 as shown by the broken line arrows in this figure. Thus, a heat radiation is performed in the second interior heat exchanger 5. Accordingly, dehumidification in the vehicle cabin can be performed without lowering the air blowing temperature in this refrigerant cycle by respectively performing heat absorption in the first interior heat exchanger 4, and radiating heat in the second interior heat exchanger 5. The heating ability and amount of dehumidification during drying can be controlled by adjusting the discharge ability of the compressor 1, the degree of opening of the damper D3, and adjusting the ability of the pump 27. Further, defrosting of the exterior heat exchanger 3 can be performed by utilizing heat radiation generated at the exterior heat exchanger 3, and lowering of the air blowing temperature can be also prevented during defrosting.

Operation in the (parallel) dehumidifying/heating mode is performed by operating the compressor 1 and the pump 27 in a state in which the four-way valve 2 is set to the position shown by the solid line in FIG. 8, and the ON-OFF valves 14, 15, 16, 17 are open. As shown by the solid line arrows in this figure, the refrigerant that is discharged from the compressor 1 flows into the brine heat exchanger 26 and is heat-exchanged with brine to heat the brine, and then branches into two flows after passing through the liquid receiver 8. A portion of the refrigerant flows into the second expansion valve 7 and the exterior heat exchanger 3 and is evaporated, and then flows into the compressor 1 through the accumulator 9. The heated brine circulates between the brine heat exchanger 27 and the second interior heat exchanger 5 as shown by the solid line arrows in this figure. Thus, a heat radiation is performed in the second interior heat exchanger 5. The residual portion of the refrigerant flows into the first expansion valve 6 and the first interior heat exchanger 4 and is evaporated, and is then mixed with the aforementioned refrigerant gas before reaching the accumulator 9. Accordingly, heating and dehumidification in the vehicle cabin can be simultaneously performed in this refrigerant cycle by performing a heat absorption in the exterior heat exchanger 3, radiating heat in the second interior heat exchanger 5 and performing a heat absorption in the first interior heat exchanger 4. The heating ability and amount of dehumidification during operation in this mode can be controlled by adjusting the discharge ability of the compressor 1, the degree of opening of the damper D3, the ability of the pump 27, and the like.

Operation in the (single) dehumidifying/heating mode is performed by operating the compressor 1 and the pump 27 in a state in which the four-way valve 2 is set to the position shown by the solid line in FIG. 8, the ON-OFF valves 15, 17 are closed, and the ON-OFF valves 14, 16 are open. As shown by the dashed line arrows in this figure, the refrigerant gas that is discharged from the compressor 1 flows into the brine heat exchanger 26 and is heat-exchanged with brine. The refrigerant then flows into the first expansion valve 6 and the first interior heat exchanger 4 through the liquid receiver 8 and is evaporated, and thereafter is introduced into the compressor 1 through the accumulator 9. The heated brine circulates between the brine heat exchanger 26 and the second interior heat exchanger 5 as shown by the dashed line arrows in this figure. Thus, a heat radiation is performed in the second interior heat exchanger 5. Accordingly, heating and dehumidification of the vehicle cabin can be simultaneously performed in this refrigerant cycle by respectively performing a heat radiating operation in the second interior heat exchanger 5 and a heat absorbing operation in the first interior heat exchanger 4. The heating ability and amount of dehumidification during operation in this mode can be controlled by adjusting the discharge ability of the compressor 1, the degree of opening of the damper D3, the ability of the pump 27, and the like.

Operation in the heating mode is performed by operating the compressor 1 and the pump 27 in a state in which the four-way valve 2 is set to the position shown by the solid line in FIG. 8, the ON-OFF valve 16 is closed, and the ON-OFF valves 14, 15, 17 are open. As shown by the broken line arrows in this figure, the refrigerant gas that is discharged from the compressor 1 flows into the brine heat exchanger 26 and is heat-exchanged with brine, then flows into the second expansion valve 7 and the exterior heat exchanger 3 through the liquid receiver 8 and is evaporated, and thereafter flows into the compressor 1 through the accumulator 9. The heated brine circulates between the brine heat exchanger 26 and the second interior heat exchanger 5 as shown by the broken line arrows in this figure. Thus, a heat radiation is performed in the second interior heat exchanger 5. Accordingly, heating in the vehicle cabin can be performed in the refrigerant cycle by performing a heat radiating operation in the second interior heat exchanger 5. The heating ability during operation in this mode can be controlled by adjusting the discharge ability of the compressor 1, the degree of opening of the damper D3, the ability of the pump 27, and the like.

As described above, in the air conditioner of the fourth embodiment, operations in five modes are made possible due to the changeover of the refrigerant cycle by using the four-way valve 2 and the ON-OFF valves 14 through 17, and the brine heat exchanger 26. An advantage results in that air-conditioning can be preferably performed in vehicles such as electric automobiles which have no internal heat source such as an internal combustion engine. Other effects are the same as those of the first embodiment.

The air conditioner shown in the fourth embodiment also can perform operations in two modes, including a drying/defrosting mode and a (parallel) dehumidifying/heating mode in the same manner as descrdibed above by the changeover of the refrigerant cycle by using the four-way valve 2 even if the ON-OFF valves 14, 15 and 16 are removed from the air conditioning circuit. Cooling drying operations can be selected in the drying/defrosting mode by adjusting the amount of ventilation to the second interior heat exchanger 5 by using the damper D3, and lowering of the air blowing temperature can be prevented during defrosting. Further, the amount of refrigerant gas flow to the exterior heat exchanger 3 and the second interior heat exchanger 5 can also be adjusted by performing on-off control of the ON-OFF valve 17.

If ON-OFF valves 14, 15, 17 are removed from the circuit while maintaining only the ON-OFF valve 16, operations can be performed in three modes, including the two modes described above and further including a heating mode in the same manner as in the fourth embodiment by means of changeover of the refrigerant cycle by using the four-way valve 2 and the ON-OFF valve 16.

If ON-OFF valves 14, 16, 17 are removed from the circuit while maintaining only the ON-OFF valve 15 operations can be performed in three modes, including the two modes described above and further including a (single) dehumidifying/heating mode in the same manner as in the fourth embodiment by means of changeover of the refrigerant cycle by using the four-way valve 2 and the ON-OFF valve 15.

If ON-OFF valves 15, 16, 17 are removed from the circuit while maintaining only the ON-OFF valve 14, operations can be performed in three modes, including the two modes described above and further including a cooling/defrosting mode in the same manner as in the fourth embodiment by means of changeover of the refrigerant cycle by using the four-way valve 2 and the ON-OFF valve 14.

If ON-OFF valves 14, 15, 16 are removed from the circuit while maintaining only the ON-OFF valve 17, operations can be performed in two modes, including the drying/defrosting mode as described above and further including a (single) dehumidifying/heating mode in the same manner as in the fourth embodiment by means of changeover of the refrigerant cycle by using the four-way valve 2 and the ON-OFF valve 17.

In addition, one or more necessary modes can be selected and set from among the five operational modes described in the air conditioner of the fourth embodiment by suitably combining two or three of the ON-OFF valves 14 through 17.

Further, if [the] expansion valves 6', 7' capable of performing a closing operation, as exemplified in the second embodiment, are used as the first and second expansion valves 6, 7, the air conditioning circuit can be simplified by eliminating the ON-OFF valves 15, 16 and replacing expansion valves 6, 7 with expansion valves 6', 7'.

Figure 9:
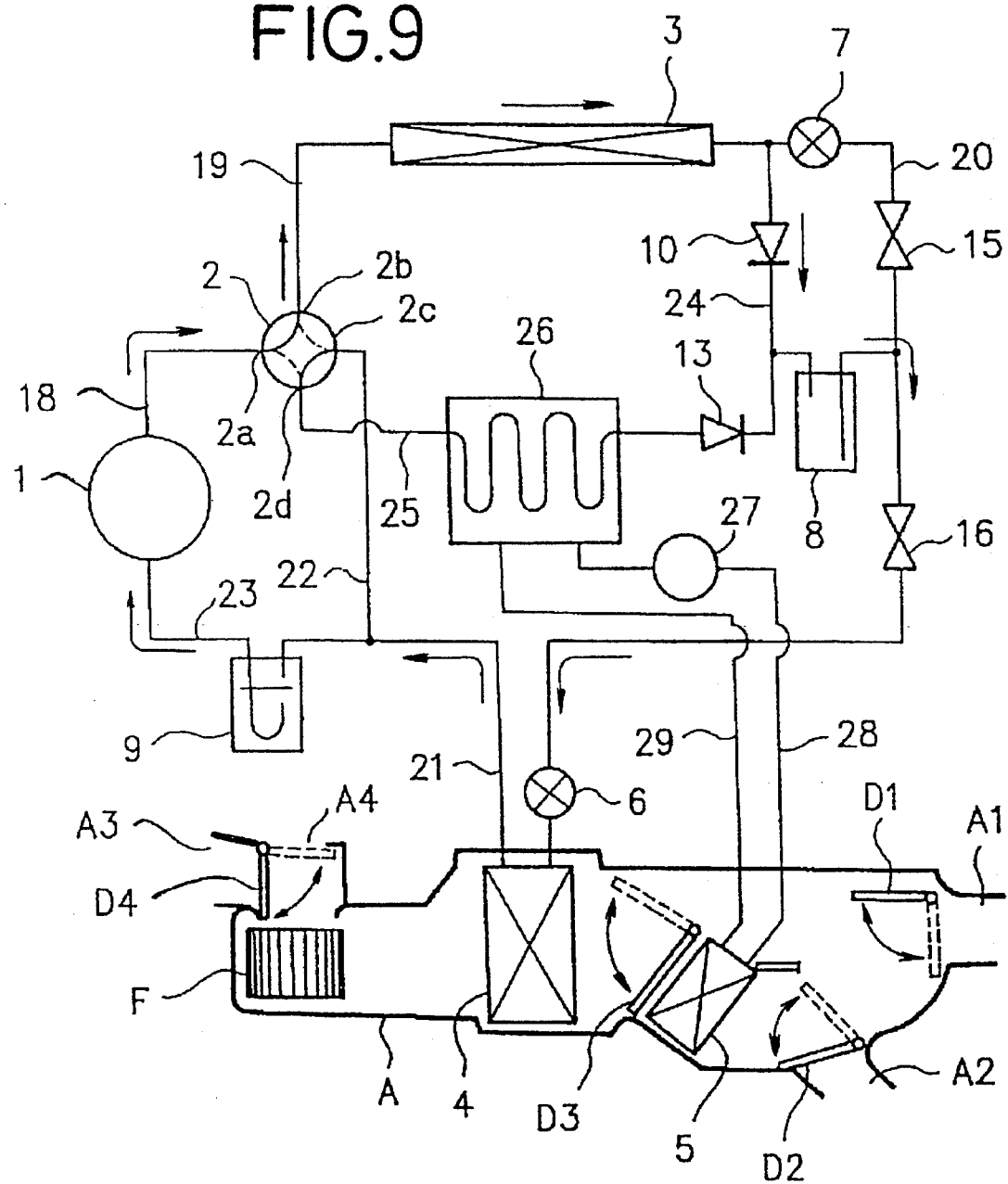
FIG. 9 is a view of a refrigerant circuit of an air conditioner for vehicles according to a fifth embodiment of the present invention.
Figure 10:
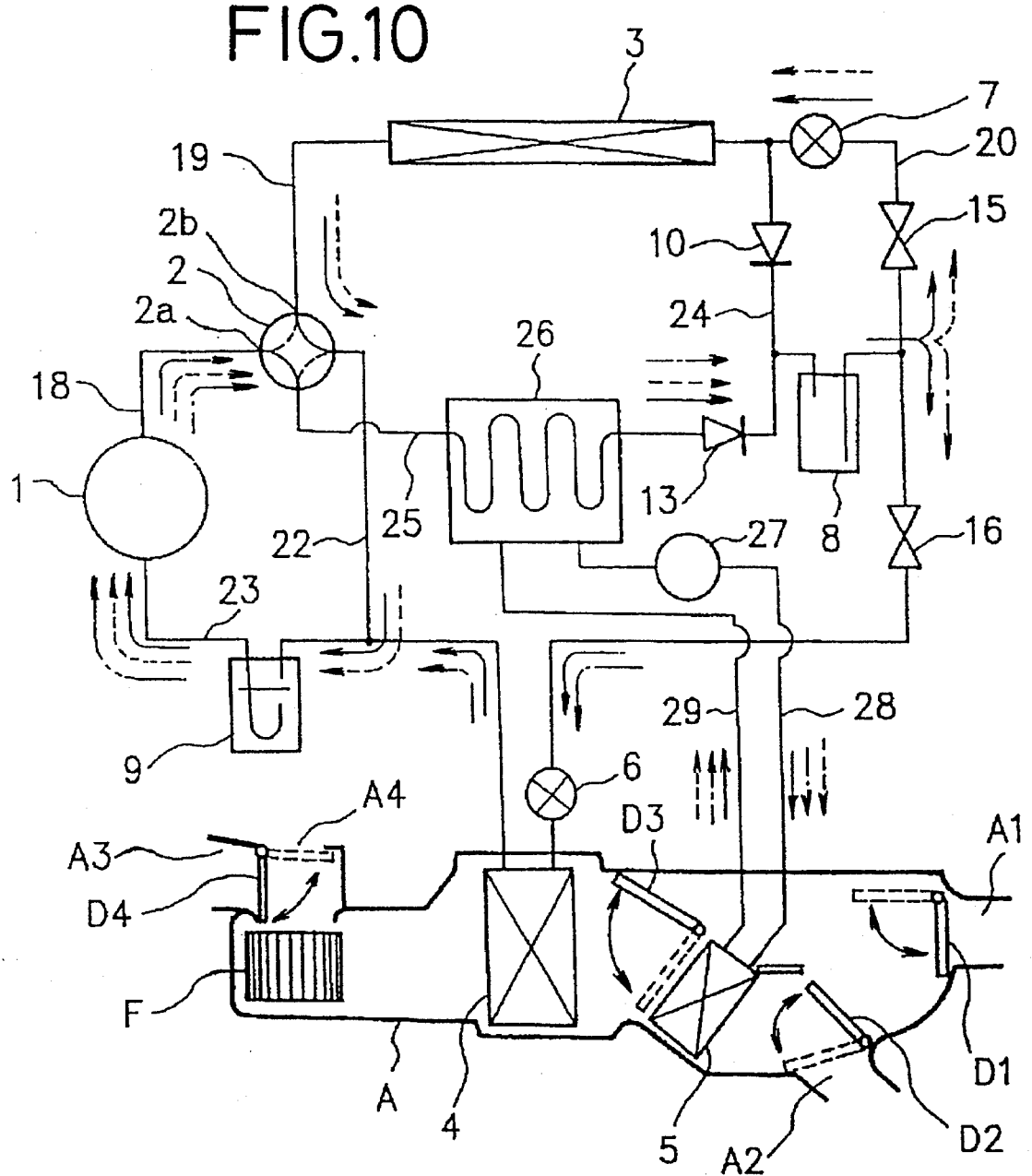
FIG. 10 is a view of the refrigerant circuit of FIG. 9 in a mode different from FIG. 9.

FIGS. 9 and 10 show a fifth embodiment of the present invention. The fifth embodiment utilizes a brine/refrigerant heat exchanger in addition to the air conditioner of the third embodiment, but also differs from the third embodiment in that the piping lines 24, 25 are separated from the second interior heat exchanger 5, and a refrigerant line of the brine heat exchanger 26 is connected between both piping lines. Further, one end of the brine line of the brine heat exchanger 26 is connected to one end of the second interior heat exchanger 5 through a piping line 28 in which an electromotive pump 27 is inserted, and the other end of the brine line of the brine heat exchanger 26 is connected to the other end of the second interior heat exchanger 5 through a piping line 29. In the same manner as in the third embodiment, a check valve 13 may be inserted at the side of the piping line 25. Other features and details are the same as those of the third embodiment. Thus, the same reference numerals are used to indicate such common features and explanation thereof is omitted.

The air conditioner can be operated in four modes, including a cooling/defrosting mode, a (parallel) dehumidifying/heating mode, a (single) dehumidifying/heating mode, and a heating mode by changing over the refrigerant cycles by using the four-way valve 2 and the ON-OFF valves 15, 16. The refrigerant cycles and functions in each of these modes will be explained below.

Operation in the cooling/defrosting mode is performed by operating the compressor 1 in a state in which the four-way valve 2 is set to the position shown by the solid line in FIG. 9, the ON-OFF valve 15 is closed, and the ON-OFF valve 16 is open. As shown by the solid line arrows in this figure, the refrigerant gas that is discharged from the compressor 1 flows into the exterior heat exchanger 3 and is condensed, then flows into the first expansion valve 6 and the first interior heat exchanger 4 through the liquid receiver 8 and is evaporated, and thereafter flows into the compressor 1 through the accumulator 9. Accordingly, cooling in the vehicle cabin can be performed in this refrigerant cycle by performing a heat absorbing operation in the first interior heat exchanger 4. Further, heat radiation generated in the exterior heat exchanger 3 can be utilized to perform rapid defrosting of the heat exchanger 3.

Operation in the (parallel) dehumidifying/heating mode is performed by operating the compressor 1 and the pump 27 in a state in which the four-way valve 2 is set to the position shown by the solid line in FIG. 10, and the ON-OFF valves 15, 16 are open. As shown by the solid line arrows in this figure, the refrigerant gas that is discharged from the compressor 1 flows into the brine heat exchanger 26 and is heat-exchanged with brine to heat the brine, and then branches into two flows after passing through the liquid receiver 8. A portion of the refrigerant flows into the second expansion valve 7 and the exterior heat exchanger 3 and is evaporated, and then flows into the compressor 1 through the accumulator 9. The heated brine circulates between the brine heat exchanger 26 and the second interior heat exchanger 5 as shown by the solid line arrows in this figure. Thus, a heat radiation is performed in the second interior heat exchanger 5. The residual portion of the refrigerant gas flows into the first expansion valve 6 and the first interior heat exchanger 4 and is evaporated, and is then mixed with the other portion of the refrigerant gas described above before reaching the accumulator 9. Accordingly, heating and dehumidification in the vehicle cabin can be simultaneously performed in this refrigerant cycle by performing heat absorption in the exterior heat exchanger 3, performing a heat radiating operation in the second interior heat exchanger 5 and performing heat absorption in the first interior heat exchanger 4. The heating ability and the amount of dehumidification during operation in this mode can be controlled by adjusting the discharge ability of the compressor 1, the degree of opening of the damper D3, the ability of the pump 27, and the like.

Operation in the (single) dehumidifying/heating mode is performed by operating the compressor 1 and the pump 27 in a state in which the four-way valve 2 is set to the position shown by the solid line in FIG. 10, the ON-OFF valve 15 is closed, and the ON-OFF valve 16 is open. As shown by the dashed line arrows in this figure, the refrigerant gas that is discharged from the compressor 1 flows into the brine heat exchanger 26 and is heat-exchanged with brine to heat the brine, then flows into the first expansion valve 6 and the first interior heat exchanger 4 through the liquid receiver 8 and is evaporated, and thereafter flows into the compressor I through the accumulator 9. The heated brine circulates between the brine heat exchanger 26 and the second interior heat exchanger 5 as shown by the dashed line arrows in the figure. Thus, a heat radiation is performed in the second interior heat exchanger 5. Accordingly, heating and dehumidification in the vehicle cabin can be simultaneously performed in this refrigerant cycle by respectively performing a heat radiating operation in the second interior heat exchanger 5 and a heat absorbing action in the first interior heat exchanger 4. The heating ability and amount of dehumidifying during operation in this mode can be controlled by adjusting the discharge ability of the compressor 1, the degree of opening of the damper D3, the ability of the pump 27, and the like.

Operation in the heating mode is performed by operating the compressor 1 and the pump 27 in a state in which the four-way valve 2 is set to the position shown by the solid line in FIG. 10, the ON-OFF valve 16 is closed, and the ON-OFF valve 15 is open. As shown by the broken line arrows in this figure, the refrigerant gas discharged from the compressor 1 flows into the brine heat exchanger 26 and is heat-exchanged with brine to heat the brine, then flows into the second expansion valve 7 and the exterior heat exchanger 3 through the liquid receiver 8 and is evaporated, and thereafter flows into the compressor 1 through the accumulator 9. The heated brine circulates between the brine heat exchanger 26 and the second interior heat exchanger 5 as shown by the broken line arrows in this figure. Thus, a heat radiation is performed in the second interior heat exchanger 5. Accordingly, heating in the vehicle cabin can be performed in this refrigerant cycle by performing a heat radiating operation in the second interior heat exchanger 5. The heating ability during operation in this mode can be controlled by adjusting the discharge ability of the compressor 1, the degree of opening of the damper D3, the ability of the pump 27, and the like.

As described above, in the air conditioner of the fifth embodiment, operations in four modes are made possible due to the changeover of the refrigerant cycle by using the four-way valve 2, the ON-OFF valves 15, 16, and the brine heat exchanger 26. An advantage results in that air-conditioning can be performed in vehicles such as electric automobiles which have no internal heat source such as an internal combustion engine. Other effects are the same as those of the third embodiment.

Further, the air conditioner of the fifth embodiment also is capable of operating in two modes, including a cooling/defrosting mode and a (parallel) dehumidifying/heating mode in the same manner as in the fifth embodiment by the changeover of the refrigerant cycle by using the four-way valve 2 even if both of the ON-OFF valves 15, 16 are removed from the air conditioning circuit.

If the ON-OFF valve 15 is removed from the circuit while maintaining only the ON-OFF valve 16, operations can be performed in three modes, including the two modes described above and further including a heating mode in the same manner as in the fifth embodiment by the changeover of the refrigerant cycle by using the four-way valve 2 and the ON-OFF valve 16.

If ON-OFF valve 16 is removed from the circuit while maintaining only the ON-OFF valve 15, operations can be performed in three modes, including the two modes described above and further including a (single) dehumidifying/heating mode in the same manner as in the fifth embodiment by the changeover of the refrigerant cycle by using the four-way valve 2 and the ON-OFF valve 15.

Further, if expansion valves 6', 7' capable of performing a closing operation, as exemplified in the second embodiment, are used as the first and second expansion valves 6, 7, the circuitcan be simplified by eliminating both ON-OFF valves 15, 16 and replacing expansion valves 6, 7 with expansion valves 6', 7'.

Figure 11:
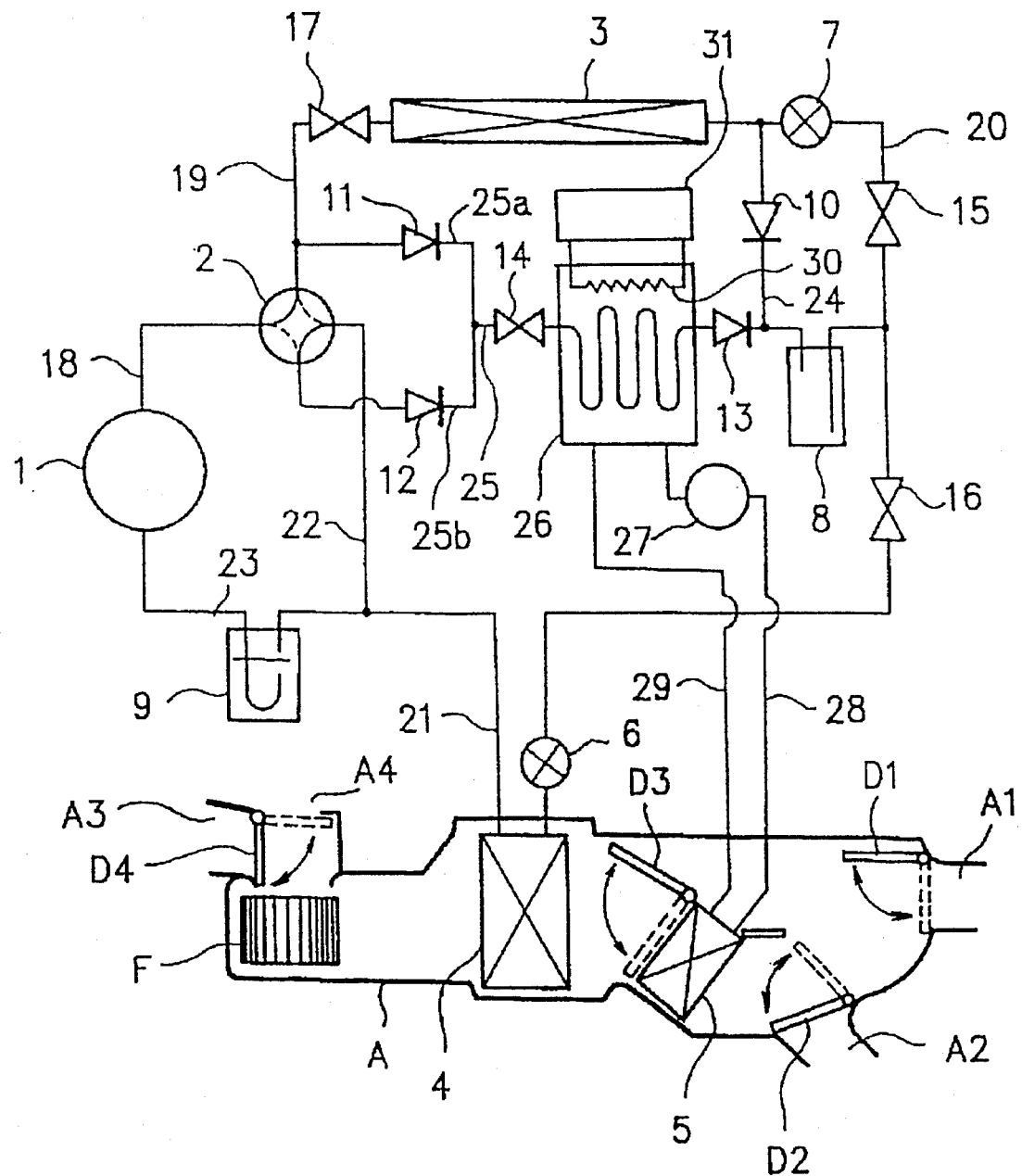
FIG. 11 is a view of a refrigerant circuit of an air conditioner for vehicles according to a sixth embodiment of the present invention.

FIG. 11 shows a sixth embodiment of the present invention. In the sixth embodiment, an air conditioner according to the fourth embodiment is provided along with a subsidiary or auxiliary heat source for heating the brine. This embodiment differs from the fourth embodiment in that an electrothermal heater 30 is arranged in the brine heat exchanger 26, and a power source 31 is connected to the electrothermal heater 30.

In this air conditioner, the heat radiating ability of the second interior heat exchanger 5 can be improved by also heating the brine with the electrothermal heater 30 during operation of the two dehumidifying/heating modes and the heating mode. Further, if brine heated by the electrothermal heater 30 is circulated to the second interior heat exchanger 5 during defrosting of the exterior heat exchanger 3 in the cooling/defrosting mode, the air blowing temperature can be adjusted by performing a heat radiating operation at the heat exchanger 5. Thus, cold air is not blown into vehicle during defrosting of the exterior heat exchanger 3. A further advantage results in that should the heat pump fail to operate normally due to low external temperatures, or if operation of the compressor 1 is forcibly stopped, heating of the vehicle cabin can still be performed by circulating the heated brine to the second interior heat exchanger 5, and thereby performing a heat radiating operation at the heat exchanger 5. Other functions and effects are the same as those of the fourth embodiment.

Figure 12:
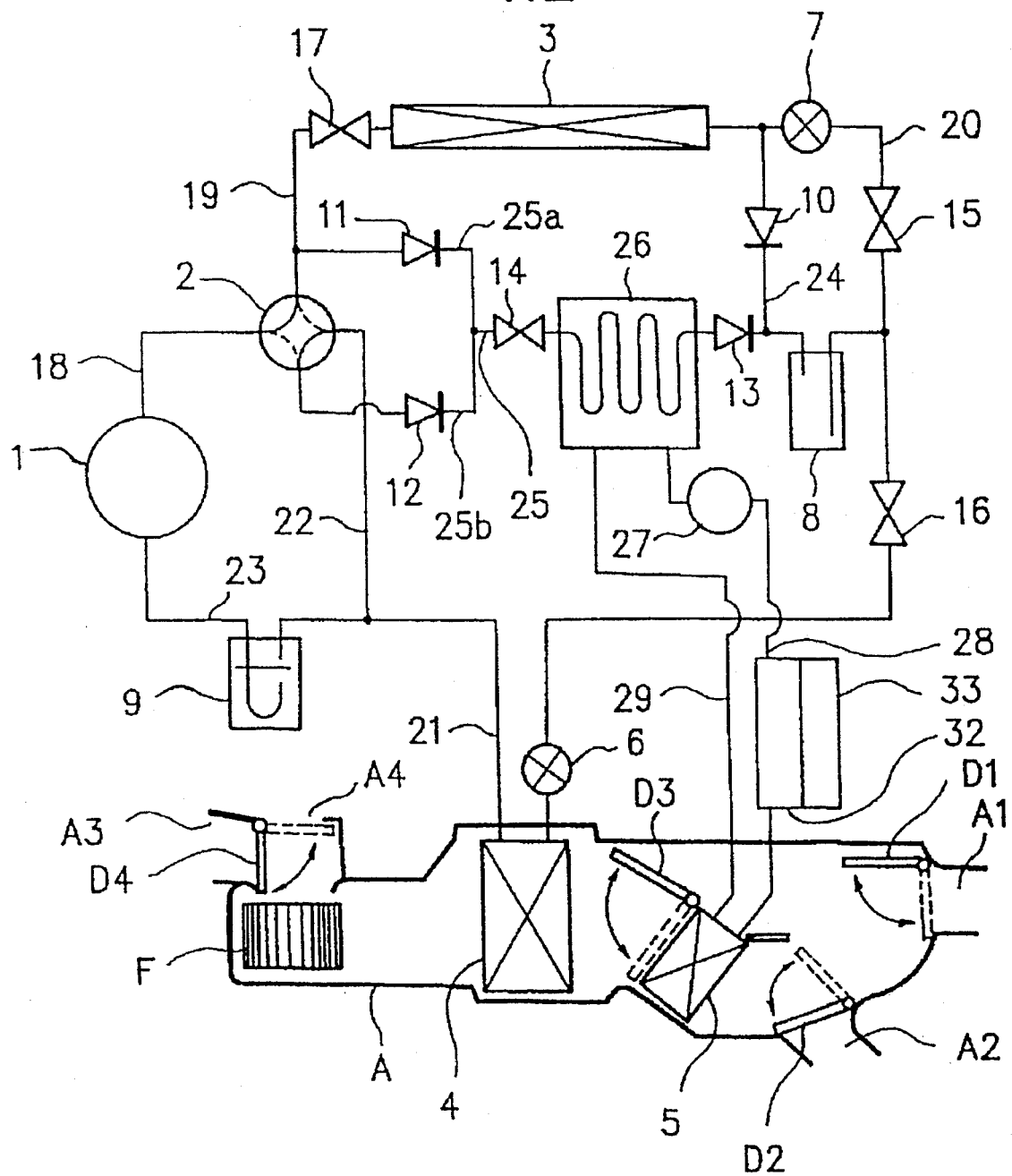
FIG. 12 is a view of a refrigerant circuit of an air conditioner for vehicles according to a seventh embodiment of the present invention.

FIG. 12 shows a seventh embodiment of the present invention. In the seventh embodiment, the air conditioner according to the fourth embodiment is additionally provided with a subsidiary or auxiliary heat source for heating brine. This embodiment differs from the fourth embodiment in that an air/brine heat exchanger (hereinafter simply referred to as an air heat exchanger) 32 is inserted into a piping line in which the brine flows, and a liquid fuel burner 33 which burns with a fuel such as kerosene is joined to the air heat exchanger 32.

In this embodiment, the heat radiating ability of the second interior heat exchanger 5 can be improved by subsidiarily heating the brine with heat from the burner 33 during operations of the two dehumidifying/heating modes and the heating mode. Further, if brine heated by the burner 33 is circulated to the second interior heat exchanger 5 during defrosting of the exterior heat exchanger 3 in the cooling/defrosting mode, the air blowing temperature can be adjusted by performing a heat radiating operation in the heat exchanger 5. Thus, cold air is not blown into the vehicle during defrosting of the exterior heat exchanger 3. A further advantage results in that should the heat pump fail to operate normally due to low external temperatures, or if operation of the compressor 1 is forcibly stopped, heating of the vehicle cabin can still be performed by circulating the heated brine to the second interior heat exchanger 5, and thereby performing a heat radiating operation in the heat exchanger 5. Other functions and effects are the same as those of the fourth embodiment.

Figure 13:
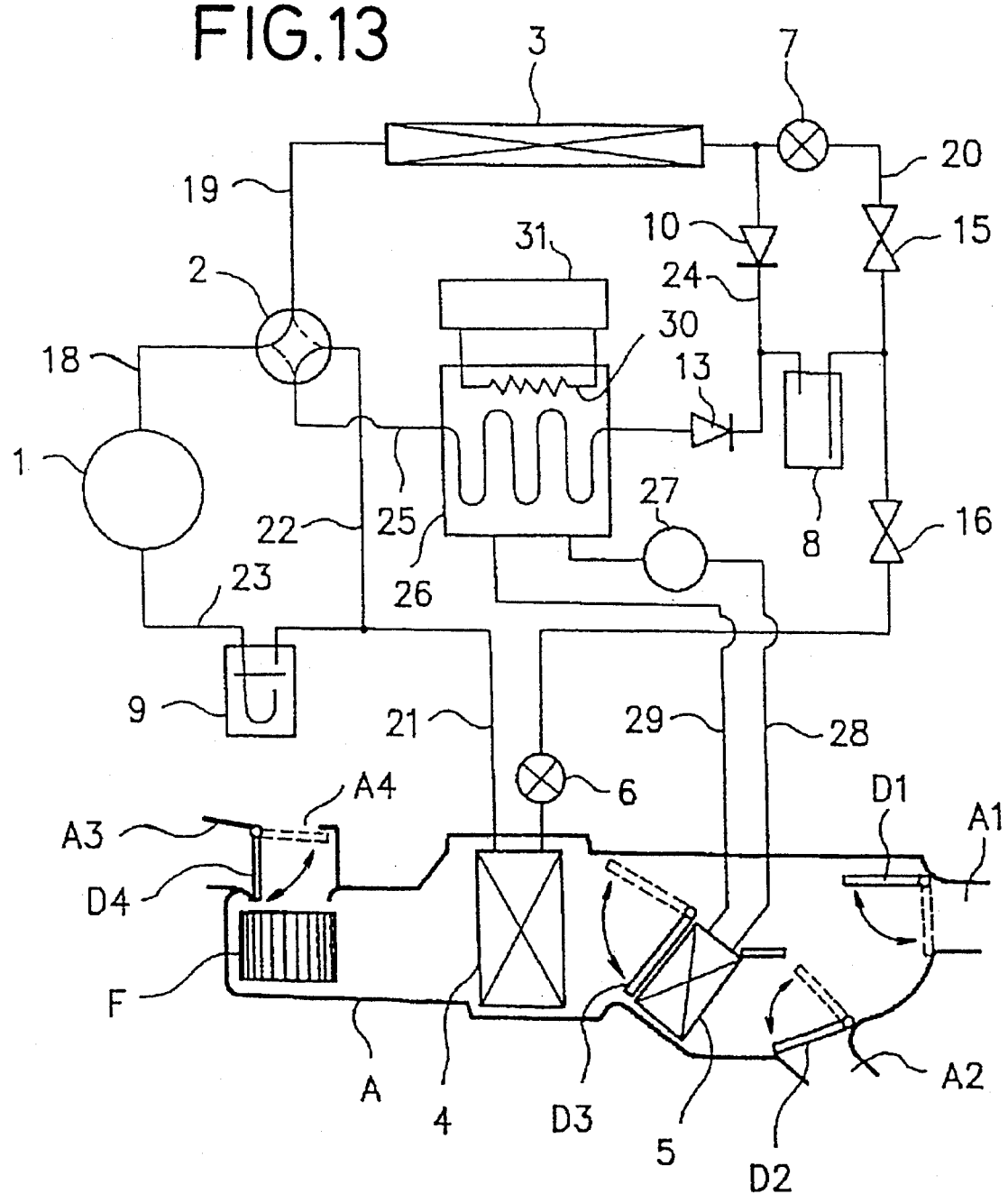
FIG. 13 is a view of a refrigerant circuit of an air conditioner for vehicles according to an eighth embodiment of the present invention.

FIG. 13 shows an eighth embodiment of the present invention. In this embodiment, the air conditioner according to the fifth embodiment is provided with a subsidiary heat source for heating brine. This embodiment differs from the fifth embodiment in that an electrothermal heater 30 is arranged in the brine heat exchanger 26, and a power source 31 is connected to the electrothermal heater 30.

In this embodiment, the heat radiating ability of the second interior heat exchanger 5 can be improved by also heating the brine with heat from the electrothermal heater 30 during operations of the two dehumidifying/heating modes and the heating mode. Further, if brine heated by the electrothermal heater 30 is circulated to the second interior heat exchanger 5 during defrosting of the exterior heat exchanger 3 in the cooling/defrosting mode, the air blowing temperature can be adjusted by performing a heat radiating operation in the heat exchanger 5. Thus, cold air is not blown into the vehicle during defrosting of the exterior heat exchanger 3. A further advantage results in that should the heat pump fail to operate normally due to low external temperatures, or if operation of the compressor 1 is forcibly stopped, heating of the vehicle cabin can still be performed by circulating the heated brine to the second interior heat exchanger 5, and thereby providing a heat radiating operation in the heat exchanger 5. Other functions and effects are the same as those of the fifth embodiment.

Figure 14:
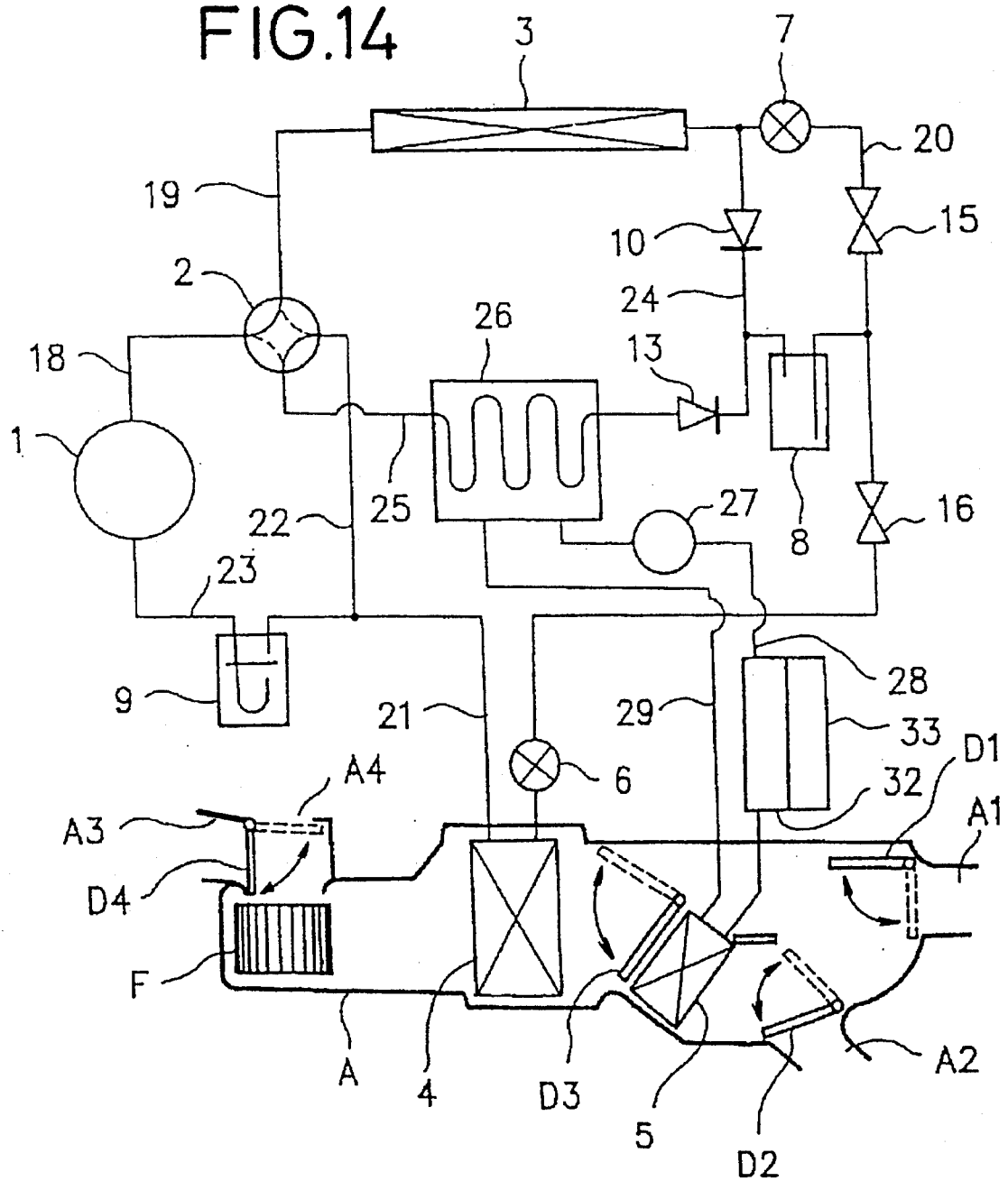
FIG. 14 is a view of a refrigerant circuit of an air conditioner for vehicles according to a ninth embodiment of the present invention.

FIG. 14 shows a ninth embodiment of the present invention. In the ninth embodiment, the air conditioner according to the fifth embodiment is provided with a subsidiary or auxiliary heat source for heating brine. This embodiment differs from the fifth embodiment in that an air heat exchanger 32 is provided in a piping line in which the brine flows, and a liquid fuel burner 33 which burns a fuel such as kerosene is joined to the air heat exchanger 32.

In this embodiment, the heat radiating ability of the second interior heat exchanger 5 can be improved by also heating brine with heat from the burner 33 during operation of the two dehumidifying/heating modes and the heating mode. Further, if brine heated by the burner 33 is circulated to the second interior heat exchanger 5 during defrosting of the exterior heat exchanger 3 in a cooling/defrosting mode, the air blowing temperature can be adjusted by performing a heat radiating operation in the heat exchanger 5. Thus, cold air is not blown into the vehicle during defrosting of the exterior heat exchanger 3. A further advantage results in that should the heat pump fail to operate normally due to low external temperatures, or if operation of the compressor 1 is forcibly stopped, heating of the vehicle cabin can still be performed by circulating the heated brine to the second interior heat exchanger 5, and thereby performing a heat radiating operation in the heat exchanger 5. Other functions and effects are the same as those of the fifth embodiment.

As described above, the sixth through ninth embodiments are typified by a subsidiary or auxiliary heat source which is incorporated into the air conditioners according to the fourth or fifth embodiments and provided with a brine heat exchanger 26. However, such a subsidiary heat source also can be employed in the air conditioners according to the first through third embodiments as a means for heating the refrigerant. More specifically, if the refrigerant gas that flows into the second interior heat exchanger 5 during heating is heated by a subsidiary heat source similar to those described above, it is possible to improve the heat radiating ability of the second interior heat exchanger 2. Further, if the refrigerant gas flowing from the exterior heat exchanger 3 during heating is heated by a subsidiary heat source, it is possible to supplement a shortage in the heat absorption amount of the exterior heat exchanger 3.

In any of the first through ninth embodiments described above, the means for controlling on and off operations has been exemplified by ON-OFF valves 14 through 17. However, the ON-OFF valves 14 through 17 may be valves which control the amount of flow of the refrigerant. In this case, it is possible to control the amount of heat radiation and heat absorption in the exterior heat exchanger 3 and in the first and second interior heat exchangers 4, 5 respectively by controlling the flow at each of the valves. In addition, check valves 11 through 13 for controlling the direction of flow of the refrigerant gas may be replaced with ON-OFF valves, flow control valves and the like.

Figure 15:
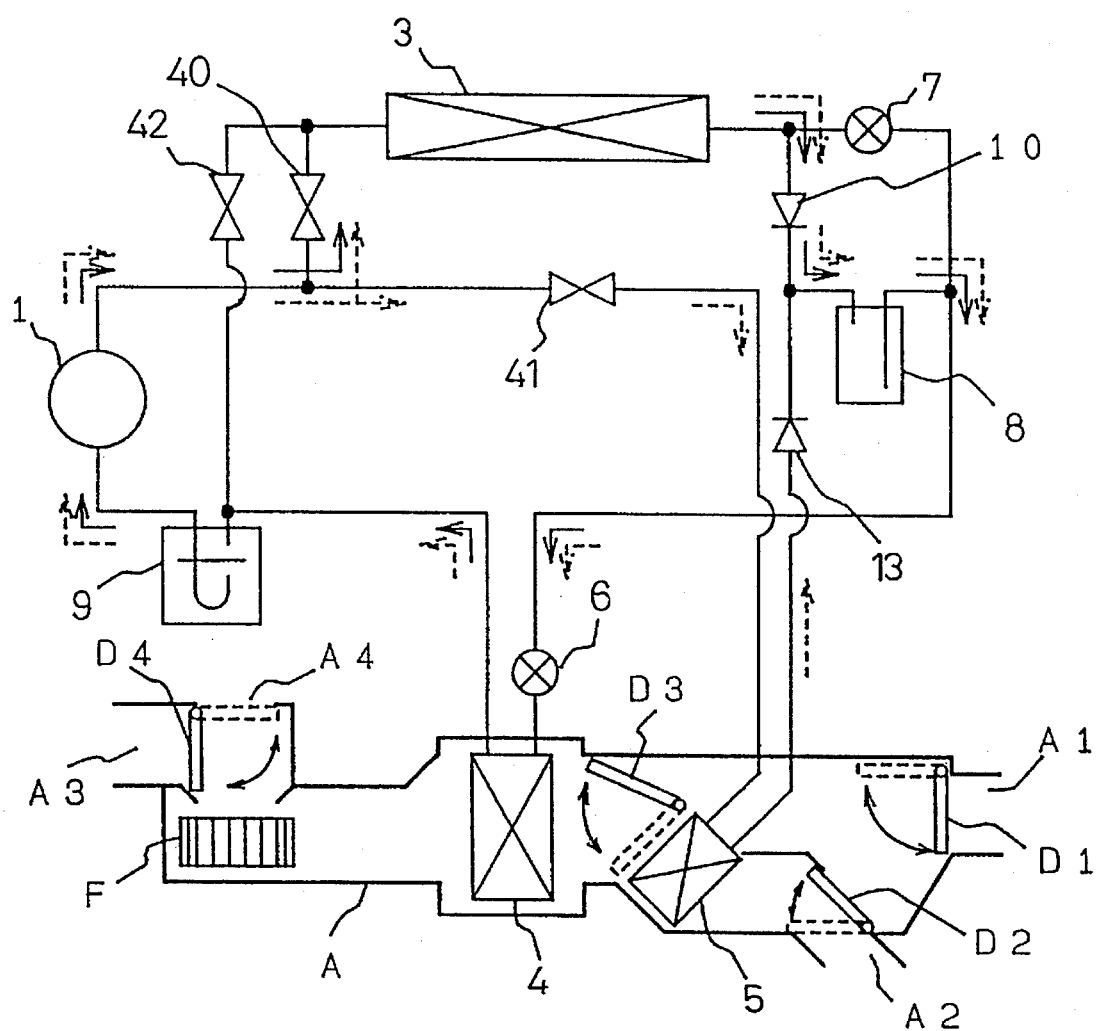
FIG. 15 is a view of a refrigerant circuit of an air conditioner for vehicles according to a tenth embodiment of the present invention.
Figure 16:
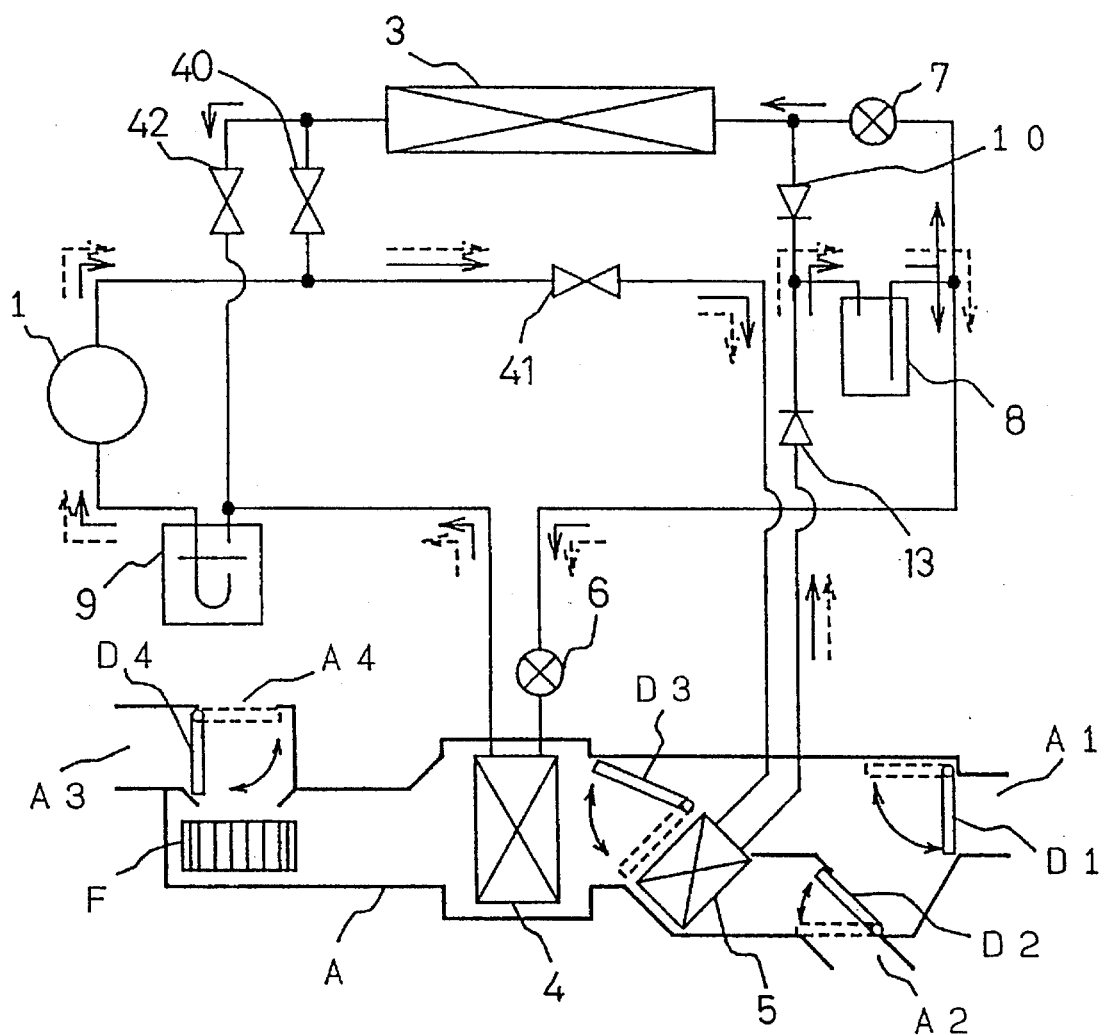
FIG. 16 is a view of the refrigerant circuit of FIG. 15 in a mode different from FIG. 15.

FIGS. 15 and 16 show a tenth embodiment of the present invention. This embodiment and the following embodiments differ from the aforementioned embodiments in that electromagnetic ON-OFF valves 40, 41, 42 are employed as an alternative to the four-way valve 2 described above.

The air conditioner according to the tenth embodiment can be operated in four modes, including a cooling/defrosting mode for performing cooling and defrosting, a drying/defrosting mode for performing a combination of drying (dehumidification) and defrosting, a (parallel) dehumidifying and heating mode for performing dehumidification simultaneously with heating, and a similar (single) dehumidifying and heating mode. The modes are chosen by changing over the refrigerant cycles by using the ON-OFF valves 40, 41, 42. The refrigerant cycles and air-conditioning functions in each of these modes will be explained below.

Operation in the cooling/defrosting mode is carried out by operating the compressor 1 in a state in which the ON-OFF valve 40 is open, and the ON-OFF valves 41, 42 are closed. As shown by the solid line arrows in FIG. 15, the refrigerant gas that is discharged from the compressor 1 flows into the exterior heat exchanger 3 through the ON-OFF valve 40 and is condensed, then flows into the first expansion valve 6 and the first interior heat exchanger 4 through the check valve 10 and the liquid receiver 8 and is evaporated, and thereafter is introduced into the compressor 1 through the accumulator 9. Accordingly, cooling in the vehicle cabin can be performed in this mode by performing a heat absorbing action in the first interior heat exchanger 4. Further, a heat radiation generated in the exterior heat exchanger 3 can be utilized to perform rapid defrosting of the exterior heat exchanger 3.

Operation in the drying/defrosting mode is carried out by operating the compressor 1 in a state in which the ON-OFF valves 40, 41 are open, and the ON-OFF valve 42 is closed. As shown by the broken line arrows in FIG. 15, a portion of the refrigerant gas that is discharged from the compressor 1 flows into the exterior heat exchanger 3 through the ON-OFF valve 40 and is condensed, then flows into the first expansion valve 6 and the first interior heat exchanger 4 through the check valve 10 and the liquid receiver 8 and is evaporated, and thereafter is led into the compressor 1 through the accumulator 9. The remaining portion of the refrigerant flows into the second interior heat exchanger 5 through the ON-OFF valve 41 and is condensed, and then is mixed with the other portion of the refrigerant after passing through the check valve 13. Accordingly, in this mode dehumidification in the vehicle cabin can be performed without lowering the air blowing temperature by performing a heat absorbing operation and a heat radiating action respectively in the first interior heat exchanger 4 and the second interior heat exchanger 5. The temperature and amount of dehumidification during drying can be controlled by adjusting the discharge ability of the compressor 1 and adjusting the degree of opening of the damper D3. Further, rapid defrosting of the exterior heat exchanger 3 can be performed by utilizing heat radiated at the exterior heat exchanger 3, and lowering of the air blowing temperature can be also prevented during the defrosting.

Operation in the (parallel) dehumidifying and heating mode is carried out by operating the compressor 1 in a state in which the ON-OFF valve 40 is closed, and the ON-OFF valves 41, 42 are open. As shown by the solid line arrows in FIG. 16, the refrigerant gas that is discharged from the compressor 1 flows into the second interior heat exchanger 5 through the ON-OFF valve 41 and is condensed, then the refrigerant branches into two flows after passing through the check valve 13 and the liquid receiver 8. A portion of the refrigerant flows into the first expansion valve 6 and the first interior heat exchanger 4 and is evaporated, and then flows into the compressor 1 through the accumulator 9. The remaining portion of the refrigerant flows into the second expansion valve 7 and the exterior heat exchanger 3 and is evaporated, and (it is joined] then is mixed with the other portion of the refrigerant gas after passing through the ON-OFF valve 42. Accordingly, in this mode, heating of the vehicle cabin can be performed by a heat radiating operation in the second interior heat exchanger 5. Further, dehumidification of the vehicle cabin can be simultaneously performed by means of heat absorption in the first interior heat exchanger 4. The heating ability and amount of dehumidification during operation in this mode can be controlled by adjusting the discharge ability of the compressor 1 and adjusting the degree of opening of the damper D3.

Operation in the (single) dehumidifying and heating mode is carried out by operating the compressor 1 in a state in which the ON-OFF valves 40, 42 are closed, and the ON-OFF valve 41 is open. As shown by the broken line arrows in FIG. 16, the refrigerant gas that is discharged from the compressor 1 flows into the second interior heat exchanger 5 through the ON-OFF valve 41 and is condensed, then flows into the first expansion valve 6 and the first interior heat exchanger 4 through the check valve 13 and the liquid receiver 8 and is evaporated, and thereafter flows into the compressor 1 through the accumulator 9. Accordingly, in this mode, heating of the vehicle cabin can be effected by performing a heat radiating action in the second interior heat exchanger 5. Further, dehumidification of the vehicle cabin can be simultaneously performed by a heat absorbing action in the first interior heat exchanger 4. The heating ability and the amount of dehumidification during operation in this mode can be controlled by adjusting the discharge ability of the compressor 1 and by adjusting the degree of opening of the damper D3.

In the air conditioner of the tenth embodiment, operations in the four modes, including a cooling/defrosting mode, a drying/defrosting mode, a (parallel) dehumidifying and heating mode and a (single) dehumidifying and heating mode, are made possible by changeover of the refrigerant cycle by using the ON-OFF valves 40, 41, 42. Thus, air-conditioning can be properly performed in vehicles such as electric automobiles which have no internal heat source such as an internal combustion engine.

Further, temperature of the blowing air can be adjusted by heat radiation in the second interior heat exchanger 5 during operation of the drying/defrosting mode. Thus, cold air is not blown into the vehicle during drying or defrosting.

Further, dehumidification can be performed simultaneously with heating during the two dehumidifying and heating modes. Thus, dew does not form on the window glass even under conditions of high humidity such as during rain or snow, and comfortable heating can be realized without impairing visibility upon a changeover from cooling to heating.

Further, heat absorbing functions can be performed in both the exterior heat exchanger 3 and the first interior heat exchanger 4 during operation in the (parallel) dehumidifying and heating mode. Thus, lowering of the heating ability can be prevented by preventing frost from developing on the exterior heat exchanger 3 when heating is performed in cold environments and the like.

Further, the four-way valve is not used for changeover of the refrigerant cycles. Thus, the layout of the system can be improved by simplifying the arrangement of the refrigerator piping lines.

Figure 17:
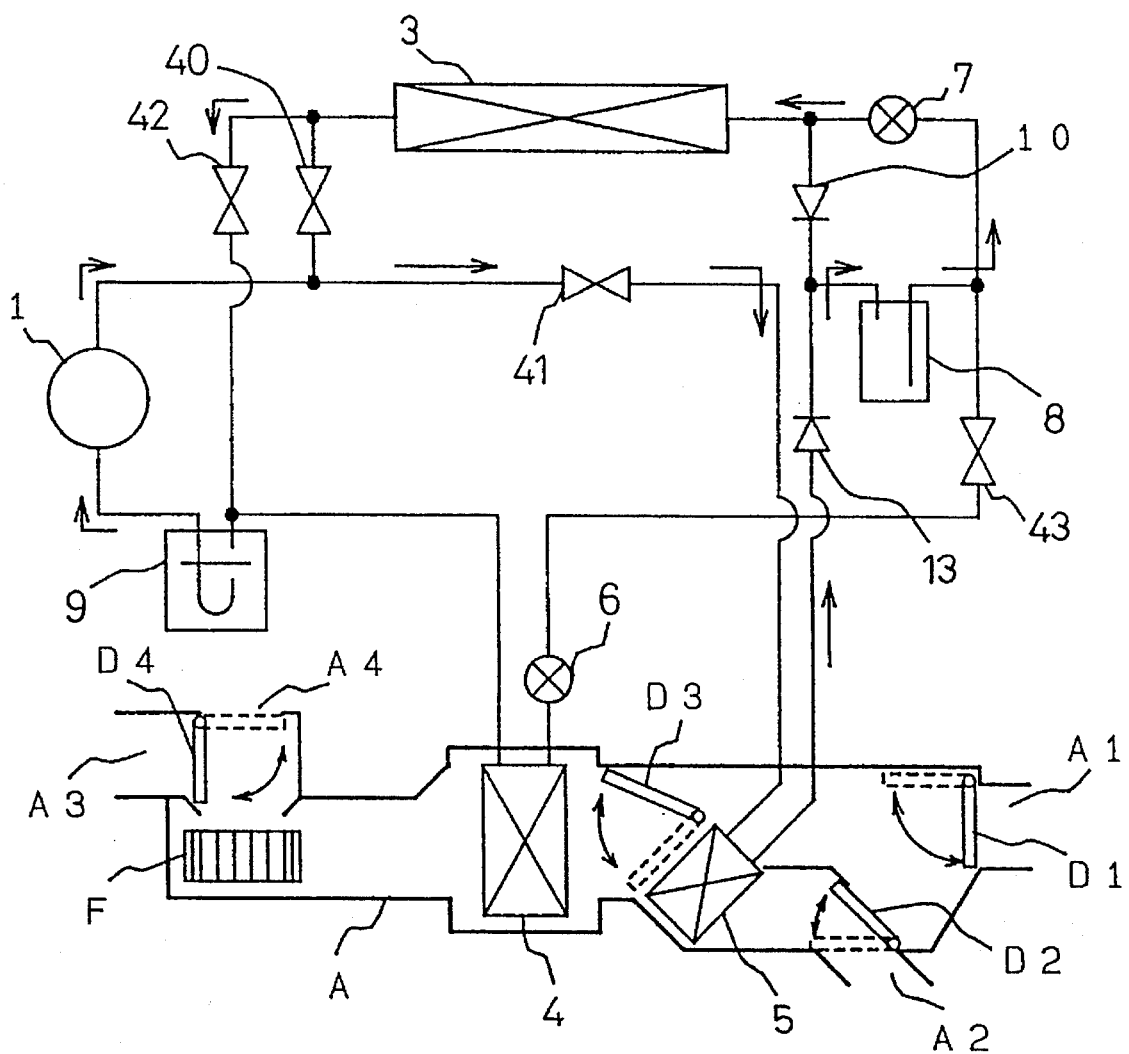
FIG. 17 is a view of a refrigerant circuit of an air conditioner for vehicles according to an eleventh embodiment of the present invention.

FIG. 17 shows an eleventh embodiment of the present invention. In this embodiment, an electromagnetic ON-OFF valve 43 is provided between the outlet of the liquid receiver 8 and the inlet of the first expansion valve 6. Other features and details are the same as in the tenth embodiment. Thus, the same numerals are used, and explanation of any common features is omitted.

The air conditioner according to the eleventh embodiment can be operated in five modes, including a cooling/defrosting mode, a drying/defrosting mode, (parallel) a dehumidifying and heating mode, a (single) dehumidifying and heating mode, and a simple heating mode by means of a changeover of refrigerant cycles by using the ON-OFF valves 40, 41, 42, 43. The refrigerant cycles and air-conditioning functions in each of these modes will be explained below.

Operations in all modes except for the simple heating mode are carried out by operating the compressor 1 in a state in which the ON-OFF valves 40, 41, 42 are switched in the same manner as in the tenth embodiment, and wherein the ON-OFF valve 43 is open. The refrigerant cycles and air-conditioning functions in each of these modes are therefore the same as in the tenth embodiment.

Operation in the simple heating mode is carried out by operating the compressor 1 in a state in which the ON-OFF valves 40, 43 are closed, and the ON-OFF valves 41, 42 are open. As shown by the solid line arrows in FIG. 17, the refrigerant gas that is discharged from the compressor 1 flows into the second interior heat exchanger 5 through the ON-OFF valve 41 and is condensed, then flows into the second expansion valve 7 and the exterior heat exchanger 3 through the check valve 13 and the liquid receiver 8 and is evaporated, and thereafter flows into the compressor 1 through the ON-OFF valve 42 and the accumulator 9. Accordingly, heating of the vehicle cabin can be performed in this mode by a heat radiating operation [at] in the second interior heat exchanger 5. The heating ability during operation in this mode can be controlled by adjusting the discharge ability of the compressor 1 and adjusting the degree of opening of the damper D3.

In the air conditioner of the eleventh embodiment, operations are possible in five modes, including an added simple heating mode, by providing the ON-OFF valve 43. An advantage results in that energy can be conserved during heating under conditions in which no dehumidification is required.

Figure 18:
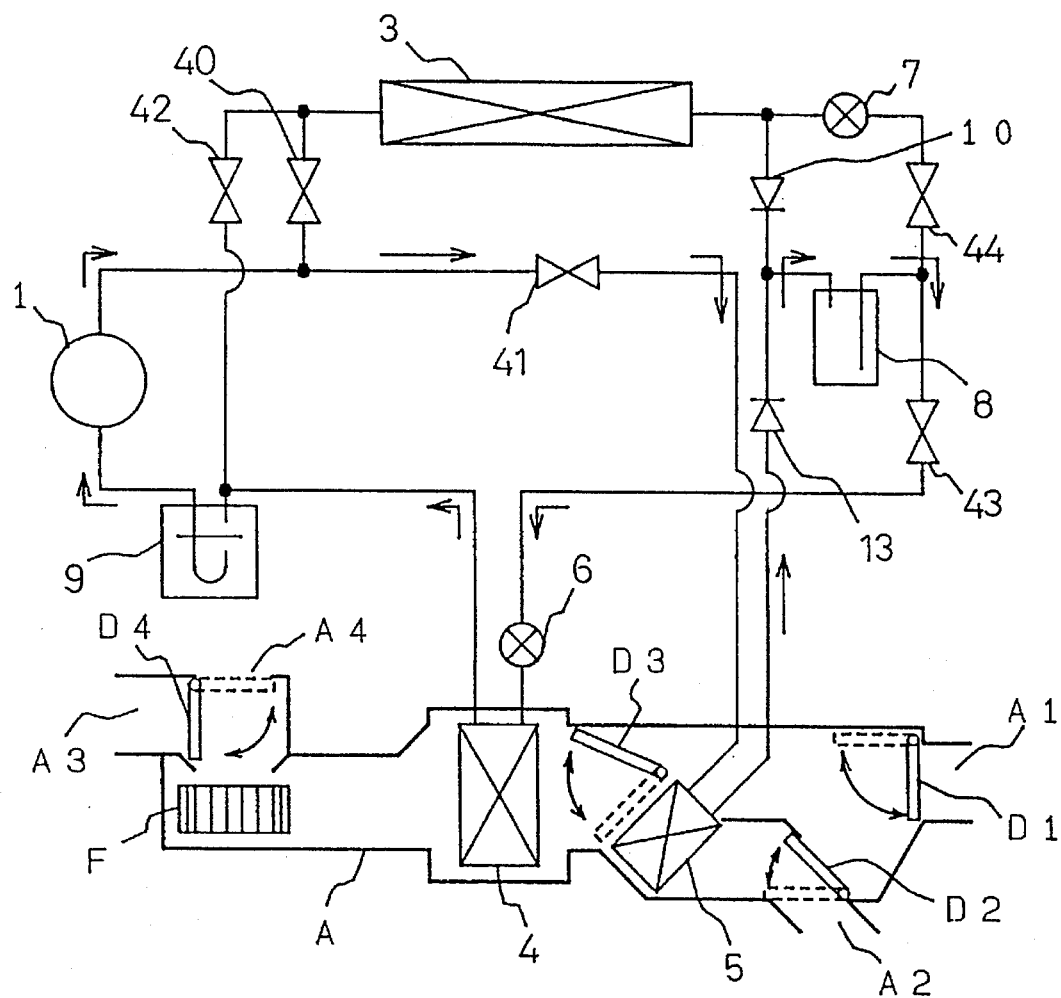
FIG. 18 is a view of a refrigerant circuit of an air conditioner for vehicles according to a twelfth embodiment of the present invention.

FIG. 18 shows a twelfth embodiment of the present invention. In this embodiment, an electromagnetic ON-OFF valve 44 is inserted between the outlet of the liquid receiver 8 and the inlet of the second expansion valve 7. Other features and details are the same as those of the eleventh embodiment. Thus the same numerals are used, and explanation of any common features is omitted.

The air conditioner of the twelfth embodiment can be operated in five modes, including a cooling/defrosting mode, a drying/defrosting mode, a (parallel) dehumidifying and heating mode, a (single) dehumidifying and heating mode, and a simple heating mode, by means of a changeover of refrigerant cycles by using the ON-OFF valves 40, 41, 42, 43, 44. The refrigerant cycles and air-conditioning functions in each of the modes will be explained below.

Operations in the cooling/defrosting mode, the drying/defrosting mode and the (single) dehumidifying and heating mode are carried out by operating the compressor 1 in a state in which the ON-OFF valves 40, 41, 42 are switched in the same manner as in the tenth embodiment, the ON-OFF valve 43 is open, and the ON-OFF valve 44 is closed. The refrigerant cycles and air-conditioning functions in each of these modes are the same as those of the tenth embodiment.

Operation in the (parallel) dehumidifying and heating mode is carried out by operating the compressor 1 in a state in which the ON-OFF valves 40, 41, 42 are switched in the same manner as in the tenth embodiment, and the ON-OFF valves 43, 44 are open. The refrigerant cycles and air-conditioning functions in this mode are the same as those of the tenth embodiment.

Operation in the (single) simple heating mode is carried out by operating the compressor 1 in a state in which the ON-OFF valves 40, 43 are closed, and the ON-OFF valves 42, 42, 44 are open. The refrigerant cycles and air-conditioning functions in this mode are the same as those of the eleventh embodiment.

In the air conditioner of the twelfth embodiment, retention of the refrigerant gas in the exterior heat exchanger 3 is prevented, and loss of performance due to shortage of the refrigerant gas can be prevented by blocking the line from the liquid receiver 8 to the second expansion valve 7 during operation in the (single) dehumidifying and heating mode. Other effects are the same as those of the tenth and eleventh embodiments.

Alternatively, ON-OFF valves 43, 44 can be omitted in the air conditioners of the eleventh and twelfth embodiments, as described above, by using electronic valves capable of being closed via remote control as the first and second expansion valves 6', 7' as described for the second embodiment.

Figure 19:
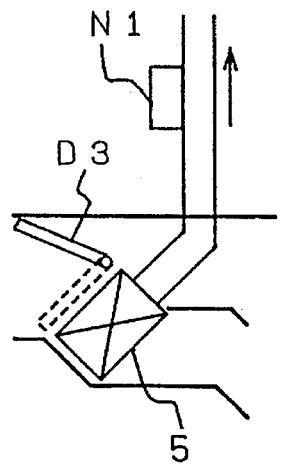
FIG. 19 is a partial view of the refrigerant circuit of FIG. 18 showing the use of a subsidiary heat source.

Further, in the tenth through twelfth embodiments, shortage of heat radiation in the second interior heat exchanger 5 can be supplemented in order to improve heating ability by providing a subsidiary or auxiliary heat source N1. More specifically, an electrothermal heater, a burner or the like can be provided in the refrigerant piping line at the inlet side of the second interior heat exchanger 5, as shown in FIG. 19. Accordingly, it is possible to heat the refrigerant flowing into the second interior heat exchanger 5 using such a subsidiary heat source N1.

Figure 20:
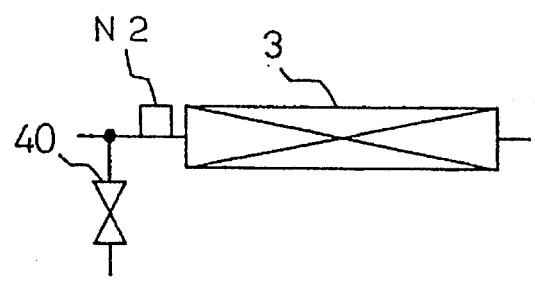
FIG. 20 is a partial view of the refrigerant circuit of FIG. 18 showing the use of another subsidiary heat source.

Further, in the tenth through twelfth embodiments, shortage in heat absorption in the exterior heat exchanger 3 can be supplemented in order to improve heating ability by providing a similar subsidiary heat source N2, as described above, in the refrigerant piping line at the outlet side of the exterior heat exchanger 3 shown in FIG. 20. Thus, it is possible to heat the refrigerant flowing from the exterior heat exchanger 3 using such a subsidiary heat source N2.

Figure 21:
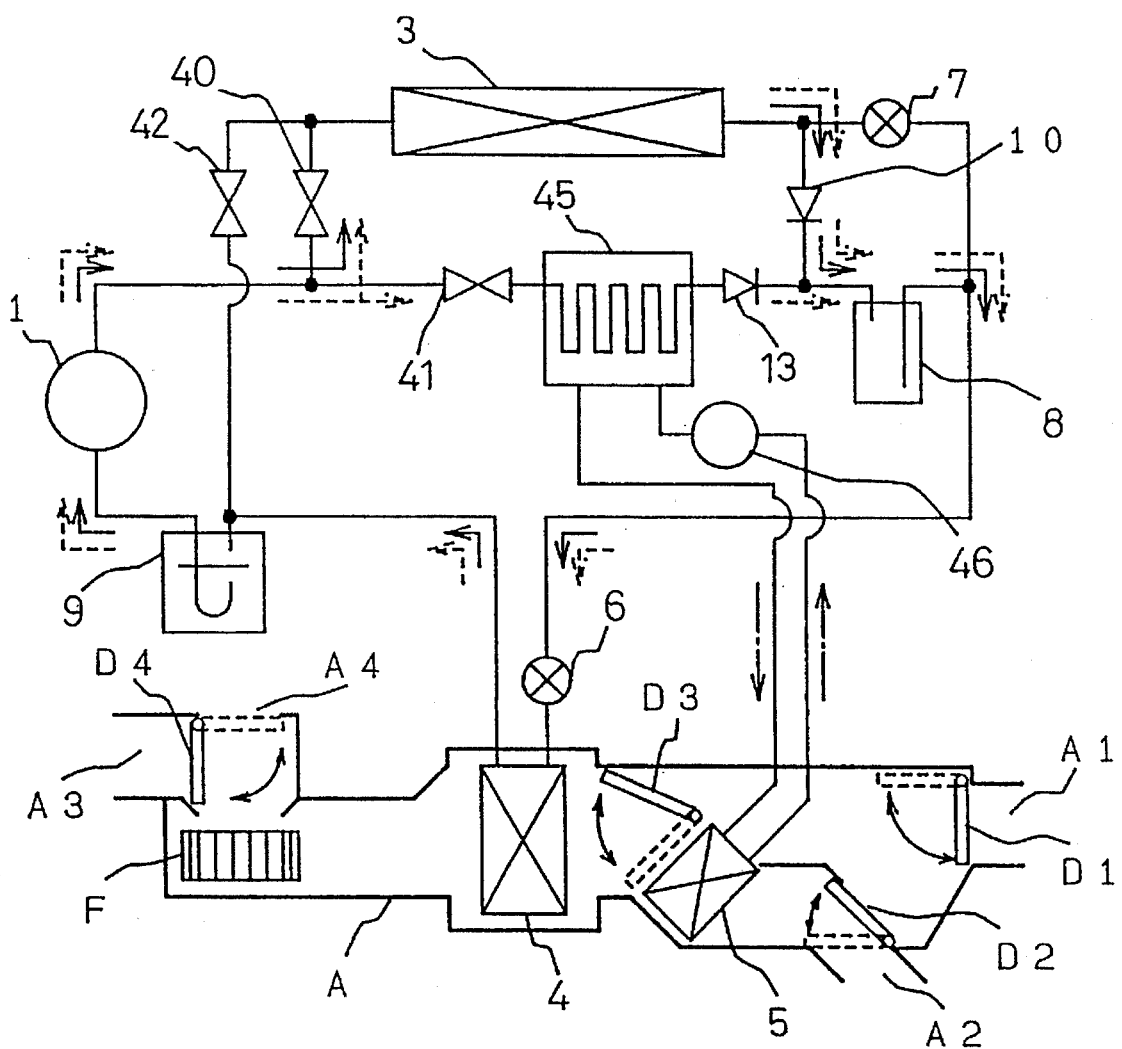
FIG. 21 is a view of a refrigerant circuit of an air conditioner for vehicles according to a thirteenth embodiment of the present invention.
Figure 22:
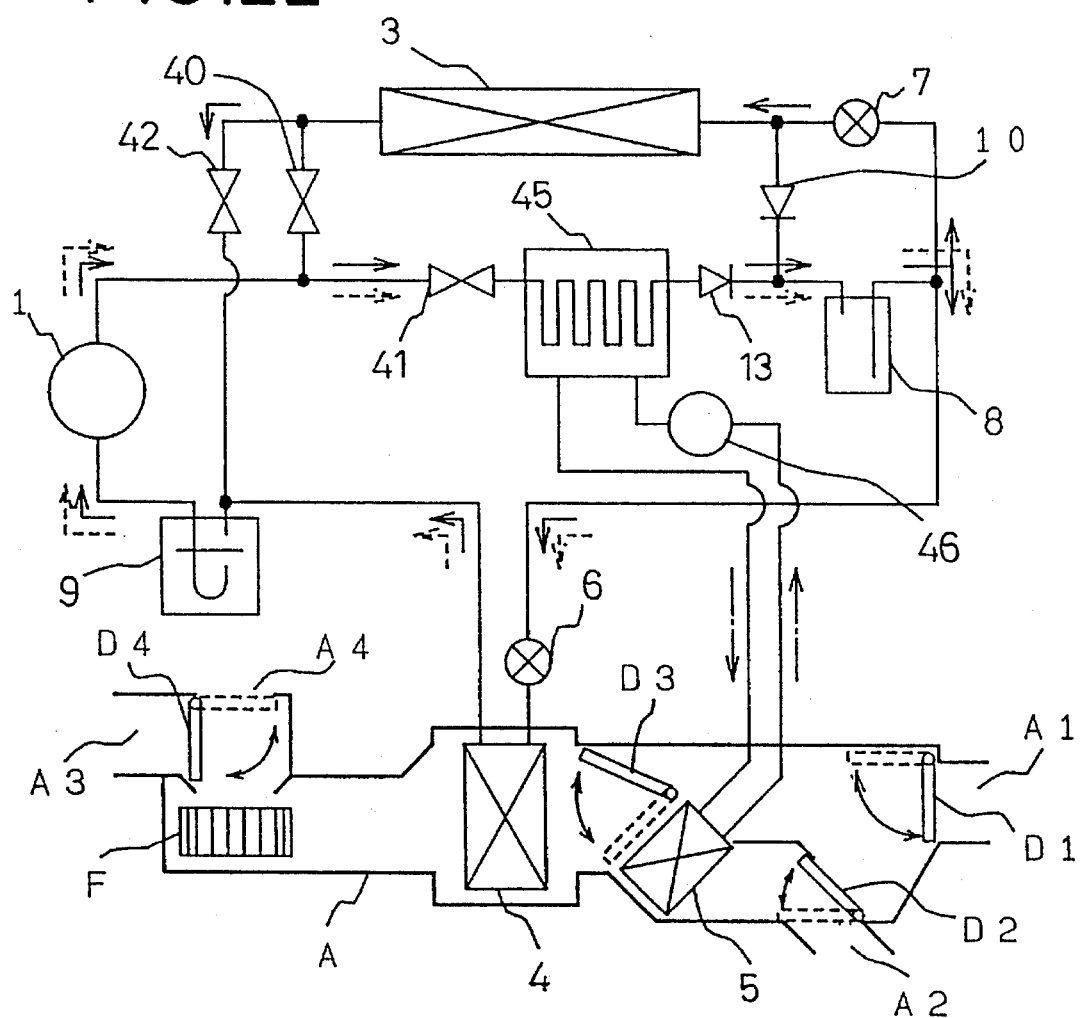
FIG. 22 is a view of the refrigerant circuit of FIG. 21 in a mode different from FIG. 21.

FIGS. 21 and 22 show a thirteenth embodiment of the present invention. In this embodiment, the refrigerant piping lines are separated from the second interior heat exchanger 5 of the air conditioner as shown in the tenth embodiment. The piping lines are connected to both refrigerant line ports of a brine/refrigerant heat exchanger 45, and both brine line ports of the brine/refrigerant heat exchanger 45 are connected to the second interior heat exchanger 5 through brine piping lines. An electromotive pump 46 is inserted into one of the brine piping lines. Other features and details are the same as in tenth embodiment. Thus, the same reference numerals are used for such common features and detail explanation thereof is omitted.

The air conditioner according to the thirteenth embodiment can be operated in four modes, including a cooling/defrosting mode, a drying/defrosting mode, a (parallel) dehumidifying and heating mode, and a (single) dehumidifying and heating mode, in the same manner as in the tenth embodiment by a changeover of refrigerant cycles using the ON-OFF valves 40, 41, 42. The refrigerant cycles and air-conditioning functions in each of these modes will be explained below.

Operation in the cooling/defrosting mode is carried out by operating the compressor 1 in a state in which the ON-OFF valve 40 is open, and the ON-OFF valves 41, 42 are closed. As shown by the solid line arrows in FIG. 21, the refrigerant gas that is discharged from the compressor 1 flows into the exterior heat exchanger 3 through the ON-OFF valve 40 and is condensed, then flows into the first expansion valve 6 and the first interior heat exchanger 4 through the check valve 10 and the liquid receiver 8 and is evaporated, and thereafter flows into the compressor 1 through the accumulator 9. Accordingly, cooling in the vehicle cabin can be performed in this mode by performing a heat absorbing operation in the first interior heat exchanger 4. Further, heat radiation generated in the exterior heat exchanger can be utilized to perform rapid defrosting of the exterior heat exchanger 3.

Operation in the drying/defrosting mode is carried out by operating the compressor 1 and the pump 46 in a state in which the ON-OFF valves 40, 41 are open, and the ON-OFF valve 42 is closed. As shown by the broken line arrows in FIG. 21, a portion of the refrigerant gas that is discharged from the compressor 1 flows into the exterior heat exchanger 3 through the ON-OFF valve 40 and is condensed, then flows into the first expansion valve 6 and the first interior heat exchanger 4 through the check valve 10 and the liquid receiver 8 and is evaporated, and thereafter flows into the compressor 1 through the accumulator 9. The remaining portion of the refrigerant gas flows into the brine/refrigerant heat exchanger 45 through the ON-OFF valve 41 and is heat-exchanged with brine to heat the brine, and (it is joined] then is mixed with the other portion of the refrigerant after passing through the check valve 13. The brine heated in the brine/refrigerant heat exchanger 45 circulates in the second interior heat exchanger 5, as shown by the dashed line arrows in this figure. Thus, a heat radiation is carried out in the second interior heat exchanger 5. Accordingly, dehumidification the vehicle cabin can be performed without lowering of the air blowing temperature in this mode by performing a heat absorbing operation and a heat radiating action respectively in the first interior heat exchanger 4 and the second interior heat exchanger 5. The temperature and amount of dehumidification during drying can be controlled by adjusting the discharge ability of the compressor 1, the degree of opening of the damper D3, and the ability of the pump 46. Further, rapid defrosting of the exterior heat exchanger 3 can be performed by utilizing heat radiation generated in the exterior heat exchanger 3, and lowering of the air blowing temperature also can be prevented during the defrosting.

Operation in the (parallel) dehumidifying and heating mode is carried out by operating the compressor 1 and the pump 46 in a state in which the ON-OFF valve 40 is closed, and the ON-OFF valves 41, 42 are open. As shown by the solid line arrows in FIG. 22, the refrigerant gas that is discharged from the compressor 1 flows into the brine/refrigerant heat exchanger 45 through the ON-OFF valve 41 and is heat-exchanged with brine to heat the brine, and then branches into two flows after passing through the check valve 13 and the liquid receiver 8. A portion of the refrigerant flows into the first expansion valve 6 and the first interior heat exchanger 4 and is evaporated, and then flows into the compressor 1 through the accumulator 9. The brine heated in the brine/refrigerant heat exchanger 45 circulates in the second interior heat exchanger 5, as shown by the dashed line arrows in this figure. Thus, a heat radiation is carried out in the second interior heat exchanger 5. The remaining portion of the refrigerant flows into the second expansion valve 7 and the exterior heat exchanger 3 and is evaporated, and then mixes with the other portion of the refrigerant gas after passing through the ON-OFF valve 42. Accordingly, in this mode, heating of the vehicle cabin can be performed by heat radiation in the second interior heat exchanger 5, and dehumidification of the vehicle cabin can be simultaneously performed by heat absorption in the first interior heat exchanger 4. the heating ability and the amount of dehumidification during operation in this mode can be controlled by adjusting the discharge ability of the compressor 1, the degree of opening of the damper D3, and the ability of the pump 46.

Operation in the (single) dehumidifying and heating mode is carried out by operating the compressor 1 and the pump 46 in a state in which the ON-OFF valves 40, 42 are closed, and the ON-OFF valve 41 is open. As shown by the broken line arrows in FIG. 22, the refrigerant gas that is discharged from the compressor 1 flows into the brine/refrigerant heat exchanger 45 through the ON-OFF valve 41 and is heat-exchanged with brine to heat the brine, then flows into the first expansion valve 6 and the first interior heat exchanger 4 through the check valve 13 and the liquid receiver 8 and is evaporated, and thereafter is introduced into the compressor 1 through the accumulator 9. The brine heated in the brine/refrigerant heat exchanger 45 circulates in the second interior heat exchanger 5 as shown by the dashed line arrows in this figure. Thus, a heat radiation is carried out in the second interior heat exchanger 5. Accordingly, in this mode, heating of the vehicle cabin can be performed by a heat radiating operation in the second interior heat exchanger 5, and dehumidification of the vehicle cabin can be simultaneously performed utilizing heat absorption in the first interior heat exchanger 4. the heating ability and the amount of dehumidification during operation in this mode can be controlled by adjusting the discharge ability of the compressor 1, the degree of opening of the damper D3, and the ability of the pump 46. Effects obtained by the air conditioner of the thirteenth embodiment are the same as those obtained in the tenth embodiment.

Figure 23:
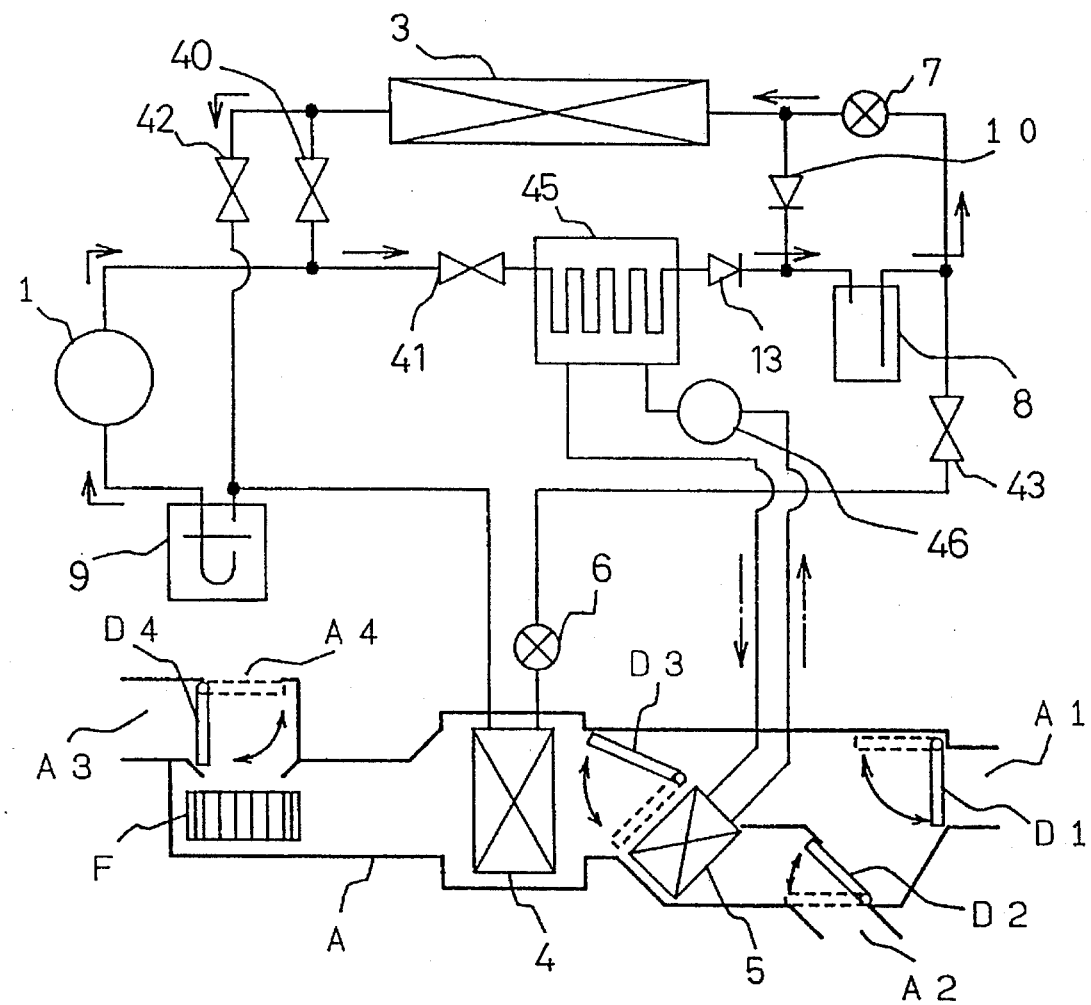
FIG. 23 is a view of a refrigerant circuit of an air conditioner for vehicles according to a fourteenth embodiment of the present invention.

FIG. 23 shows a fourteenth embodiment of the present invention. In this embodiment, an electromagnetic ON-OFF valve 43 is provided between the outlet of the liquid receiver 8 and the inlet of the first expansion valve 6. Other features and details are the same as in the thirteenth embodiment. Thus, the same reference numerals are used for common features and detail explanation thereof is omitted.

The air conditioner of the fourteenth embodiment can be operated in five modes, including a cooling/defrosting mode, a drying/defrosting mode, a (parallel) dehumidifying and heating mode, a (single) dehumidifying and heating mode, and a simple heating mode, by a changeover of refrigerant cycles by using the ON-OFF valves 40, 41, 42, 43. The refrigerant cycles and air-conditioning functions in each of the modes will be explained below.

Operation in all modes except for the simple heating mode are carried out by operating the compressor 1 and the pump 46 (only the compressor 1 is operated in the cooling/defrosting mode) in a state in which the ON-OFF valves 40, 41, 42 are switched in the same manner as in the thirteenth embodiment, and the ON-OFF valve 43 is open. The refrigerant cycles and air-conditioning functions in each of these modes are the same as those of the thirteenth embodiment.

Operation in the simple heating mode is carried out by operating the compressor 1 and the pump 46 in a state in which the ON-OFF valves 40, 43 are closed, and the ON-OFF valves 41, 42 are open. As shown by the solid line arrows in FIG. 23, the refrigerant gas discharged from the compressor 1 flows into the brine/refrigerant heat exchanger 45 through the ON-OFF valve 41 and is heat-exchanged with brine to heat the brine, then flows into the second expansion valve 7 and the exterior heat exchanger 3 through the check valve 13 and the liquid receiver 8 and is evaporated, and thereafter flows into the compressor 1 through the ON-OFF valve 42 and the accumulator 9. The brine heated in the brine/refrigerant heat exchanger 45 circulates in the second interior heat exchanger 5 as shown by the dashed line arrows in this figure. Thus, a heat radiation is carried out in the second interior heat exchanger 5. Accordingly, heating in the vehicle cabin can be performed in this mode by performing a heat radiating operation in the second interior heat exchanger 5. the heating ability during operation in this mode can be controlled by adjusting the discharge ability of the compressor 1, the degree of opening of the damper D3, and the discharge ability of the pump 46.

According to the air conditioner of the fourteenth embodiment, operations are possible in five modes, including an additional simple heating mode, by providing the ON-OFF valve 43. An advantage results in that energy can be conserved during heating under conditions in which no dehumidification is required. Other effects are the same as those of the thirteenth embodiment.

Figure 24:
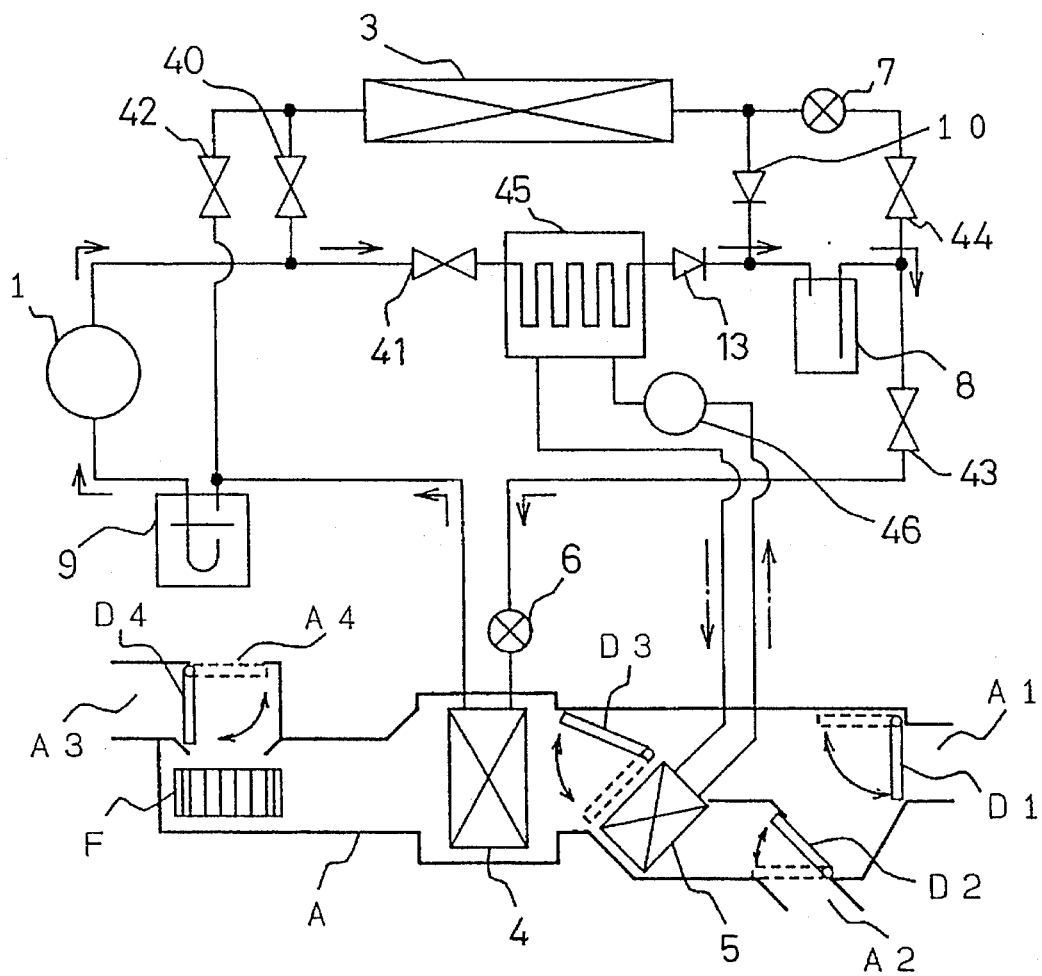
FIG. 24 is a view of a refrigerant circuit of an air conditioner for vehicles according to a fifteenth embodiment of the present invention.

FIG. 24 shows a fifteenth embodiment of the present invention. In this embodiment, an electromagnetic ON-OFF valve 44 is provided between the outlet of the liquid receiver 8 and the inlet of the second expansion valve 7. Other features and details are the same as in the fourteenth embodiment. Thus, the same reference numerals are adopted for common elements, and detailed explanation thereof which is omitted.

The air conditioner according to the fifteenth embodiment can be operated in five modes, including a cooling/defrosting mode, a drying/defrosting mode, a (parallel) dehumidifying and heating mode, a (single) dehumidifying and heating mode, and a simple heating mode, by a changeover of refrigerant cycles by using the ON-OFF valves 40, 41, 42, 43, 44. The refrigerant cycles and air-conditioning functions in each of these modes will be explained below.

Operation in the cooling/defrosting mode, the drying/defrosting mode and the (single) dehumidifying and heating mode is carried out by operating the compressor 1 and the pump 46 (only the compressor 1 is operated in the cooling/defrosting mode) in a state in which the ON-OFF valves 40, 41, 42 are switched in the same manner as in the thirteenth embodiment, the ON-OFF valve 43 is open, and the ON-OFF valve 44 is closed. The refrigerant cycles and air-conditioning functions in each of these modes are the same as those of the thirteenth embodiment.

Operation in the (parallel) dehumidifying and heating mode is carried out by operating the compressor 1 and the pump 46 in a state in which the ON-OFF valves 40, 41, 42 are switched in the same manner as in the thirteenth embodiment, and wherein the ON-OFF valves 43, 44 are open. The refrigerant cycles and air-conditioning functions in this mode are the same as those of the fourteenth embodiment.

Operation in the (single) simple heating mode is carried out by operating the compressor 1 and the pump 46 in a state in which the ON-OFF valves 40, 43 are closed, and the ON-OFF valves 41, 42, 44 are open. The refrigerant cycles and air-conditioning functions in this mode are the same as those of the fourteenth embodiment.

According to the air conditioner of the fifteenth embodiment, retention of the refrigerant in the exterior heat exchanger 3 is reliably prevented by blocking the line from the liquid receiver 8 to the second expansion valve 7 during operation in the (single) dehumidifying and heating mode. Other effects and advantages are the same as those of the thirteenth and fourteenth embodiments.

Alternatively, the ON-OFF valves 43, 44 can be omitted in the air conditioners of the fourteenth and fifteenth embodiments, by using electronic valves capable of performing a closing operation via remote control, as the first and second expansion valves 6', 7' as described for the second embodiment.

Figure 25:
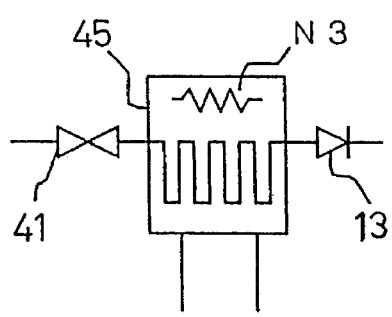
FIG. 25 is a partial view of the refrigerant circuitry of FIG. 24 showing the use of a subsidiary heat source.
Figure 26:
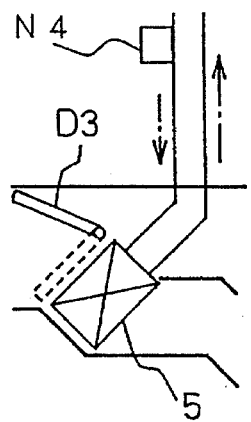
FIG. 26 is a partial view of the refrigerant circuit of FIG. 24 showing the use of another subsidiary heat source.

Further, in the air conditioners of the thirteenth through fifteenth embodiments, reduction in the amount of heat radiation in the second interior heat exchanger 5 can be supplemented during heating in order to improve the heating ability by arranging a subsidiary heat source N3, such as an electrothermal heater__, in the brine line of the brine/refrigerant heat exchanger 45 as shown in FIG. 25, or by providing an additional subsidiary heat source N4 comprising an electrothermal heater, a burner or the like in the brine piping line at the brine inlet side of the second interior heat exchanger 5 as shown in FIG. 26. It is thereby possible to heat the brine flowing into the second interior heat exchanger 5 by using such subsidiary heat sources N3, N4. Heating can be conveniently performed by circulating the brine heated by the subsidiary heat source N3 or N4 to the second interior heat exchanger 5 when the refrigerant circuit fails to operate normally due to low external temperatures, or even when operation of the compressor 1 is stopped by force.

Further, in the air conditioners of the thirteenth through fifteenth embodiments, a shortage in heat absorption in the exterior heat exchanger 3 can be supplemented during heating in order to improve the ability of the heat exchanger 3 by providing a similar subsidiary heat source N2 as shown in FIG. 20 in the refrigerant piping line at the refrigerant outlet side of the exterior heat exchanger 3. It is thereby possible to heat the refrigerant gas flowing from the exterior heat exchanger 3 using the subsidiary heat source N2.

The ON-OFF valves 40, 41, 42, 43, 44 used in each of the tenth through fifteenth embodiments may be valves which are capable of controlling a flow amount. In such a case, the heat absorption and radiation amounts in the exterior heat exchanger 3 and the first and second interior heat exchangers 4, 5 can be controlled respectively by means of such flow control valves. Further, the check valves 10, 13 may be replaced with ON-OFF valves, flow control valves and the like, provided that they can also control the flow direction.

As described above in detail, the air conditioners of the present invention provide reliable heating and dehumidification to a vehicle cabin. Heating and dehumidification can simultaneously be performed by respectively performing a heat radiating operation in the second interior heat exchanger and a heat absorbing operation in the first interior heat exchanger, by introducing all or part of a refrigerant gas that has passed through the second interior heat exchanger into the first interior heat exchanger through a first expansion means. No impairment of visibility occurs on the window glass of the vehicle when heating is performed under conditions of high humidity such as during rain or snow, as well as when a changeover is performed from cooling to heating. Further, a dehumidifying operation can be performed without lowering of the air blowing temperature, and hence comfortable air-conditioning can be realized.

Further, according to the present invention, operations can be performed in four modes, including a cooling/defrosting mode, a drying/defrosting mode, a (parallel) dehumidifying and heating mode, and a (single) dehumidifying and heating mode, by means of a changeover of the refrigerant cycles by using control valves. Accordingly, air-conditioning can be properly performed in vehicles such as electric automobiles which possess no internal heat source such as an internal combustion engine. Further, dehumidification can be performed simultaneously with heating in the two dehumidifying and heating modes. Thus, dew does not develop on the window glass under high humidity such as during rain or snow, and comfortable heating can be realized while preventing impairment of visibility upon changeover from cooling to heating. Further, the air blowing temperature can be adjusted in the drying/defrosting mode due to the heat radiating action performed in the second interior heat exchanger. Thus, cold air is not blown into the vehicle during drying or defrosting. Further, the layout of the system can be greatly simplified by the arrangement of the refrigerant piping lines.

Further, operation in the simple heating mode can be performed by suppressing the supply of the refrigerant into the first interior heat exchanger by closing the first expansion means during changeover of the valves in the (parallel) dehumidifying and heating mode. Accordingly, an advantage results in that energy can be saved when heating ms performed under conditions requiring no dehumidification.

Further, operation in the simple heating mode can be performed by suppressing the supply of the refrigerant into the first interior heat exchanger by closing the control valve provided at the inlet side of the first expansion means during changeover of the valves in the (parallels dehumidifying and heating mode. Accordingly, a similar advantage results in that energy can be conserved when heating is performed under conditions requiring no dehumidification.

Further, decrease in heating ability due to shortage of the refrigerant gas can be prevented by (canceling] prohibiting retention of the refrigerant in the exterior heat exchanger by closing the control valve provided at the inlet side of the second expansion means when the valves are set in the (single) dehumidifying and heating mode.

Further, shortage in the amount of heat radiation in the second interior heat exchanger can be supplemented to improve heating ability, by heating the refrigerant gas or the brine flowing into the second interior heat exchanger.

Additionally, shortage in the amount of heat absorption in the exterior heat exchanger can be supplemented to improve heating ability, by heating the refrigerant gas flowing from the exterior heat exchanger.

What is claimed is:

1. An air conditioner of a heat pump type for use in a vehicle, comprising:

a compressor;

an exterior heat exchanger;

a first interior heat exchanger;

a second interior heat exchanger;

first expansion means;

second expansion means;

valve means switchable between respective positions for changing between respective refrigerant cycles thereby enabling heating and cooling in a room of said vehicle, wherein said second interior heat exchanger is used as a heat radiator at least during heating of said room; and a piping line means;

wherein said piping line means is configured, in a heating mode, for introducing a refrigerant gas which has passed through said second interior heat exchanger into said exterior heat exchanger through said second expansion means;

said piping line means is configured, in a cooling mode, for introducing said refrigerant gas which has passed through said second interior heat exchanger into said first interior heat exchanger through said first expansion means, wherein said refrigerant gas flows from said second interior heat exchanger to said first interior heat exchanger without passing through said exterior heat exchanger or said second expansion means.

2. An air conditioner for vehicles according to claim 1 wherein:

said second interior heat exchanger is connected to a brine/refrigerant heat exchanger inserted into a refrigerant circuitry, to circulate brine to said second interior heat exchanger.

3. An air conditioner for vehicles according to claim 1, further comprising:

a subsidiary heat source provided for heating the refrigerant gas flowing into said second interior heat exchanger.

4. An air conditioner for vehicles according to claim 1, further comprising:

a subsidiary heat source provided for heating the refrigerant gas flowing from said exterior heat exchanger.

5. An air conditioner for vehicles according to claim 2, further comprising:

a subsidiary heat source provided for heating the brine.

6. An air conditioner for vehicles according to claim 1, including:

a four-way type valve with its first port connected to a discharge port of said compressor;

said exterior heat exchanger having one end connected to a second port of said four-way type valve;

said first expansion means having its inlet contracted to the other end of said exterior heat exchanger through a first control valve;

said first interior heat exchanger having its inlet connected to an outlet of said first expansion means and with its outlet connected to an inlet port of said compressor;

said second interior heat exchanger having its inlet connected to a fourth port of the four-way type valve through a second control valve and with its outlet connected between said first control valve and said first expansion means; and said second expansion means having its inlet connected between said first control valve and said first expansion means and with its outlet connected to the other end of said exterior heat exchanger, wherein:

said second port of the four-way type valve is connected to the inlet of said second interior heat exchanger through a third control valve; and a third port of said four-way type valve is connected to the inlet port of said compressor.

7. An air conditioner for vehicles according to claim 6, wherein:

said first and second expansion means are valves capable of closing operations.

8. An air conditioner for vehicles according to claim 6, further comprising:

a control valve provided at the inlet side of said first expansion means.

9. An air conditioner for vehicles according to claim 6, further comprising:

a control valve provided at the inlet side of said second expansion means.

10. An air conditioner for vehicles according to claim 6, further comprising:

a control valve provided into at least one side of the inlet and the outlet of said second interior heat exchanger.

11. An air conditioner for vehicles according to claim 6, further comprising:

a control valve provided between the second port of said four-way type valve and one end of said exterior heat exchanger.

12. An air conditioner for vehicles according to claim 6, further comprising:

a subsidiary heat source is provided for heating the refrigerant gas flowing into said second interior heat exchanger.

13. An air conditioner for vehicles according to claim 6, further comprising:

a subsidiary heat source is provided for heating the refrigerant gas flowing from said exterior heat exchanger.

14. An air conditioner for vehicles according to claim 1, including:

a four-way type valve with its first port connected to a discharge port of said compressor;

said exterior heat exchanger having its one end connected to a second port of said four-way type valve;

said first expansion means having its inlet connected to the other end of said exterior heat exchanger through a first control valve;

said first interior heat exchanger having its inlet connected to an outlet of said first expansion means and with its outlet connected to an inlet port of said compressor;

said second interior heat exchanger having its inlet connected to a fourth port of said four-way type valve and with its outlet connected between said first control valve and said first expansion means; and said second expansion means with its inlet connected between said first control valve and said first expansion means and with its outlet connected to the other end of said exterior heat exchanger, wherein:

a third port of said four-way type valve is connected to said inlet port of said compressor; and a second control valve is provided at one of the inlet and outlet sides of said second interior heat exchanger.

15. An air conditioner for vehicles according to claim 14, wherein:

said first and second expansion means are valves capable of closing operations.

16. An air conditioner for vehicles according to claim 14, further comprising:

a control valve provided at the inlet side of said first expansion means.

17. An air conditioner for vehicles according to claim 14, further comprising:

a control valve provided at the inlet side of said second expansion means.

18. An air conditioner for vehicles according to claim 14, further comprising:

a subsidiary heat source provided for heating the refrigerant gas flowing into said second interior heat exchanger.

19. An air conditioner for vehicles according to claim 14, further comprising:

a subsidiary heat source provided for heating the refrigerant gas flowing from said exterior heat exchanger.

20. An air conditioner for vehicles according to claim 1, including:

a four-way type valve with its first port connected to a discharge port of said compressor;

said exterior heat exchanger having its one end connected to a second port of said four-way type valve;

said first expansion means having its inlet connected to the other end of said exterior heat exchanger through a first control valve;

said first interior heat exchanger having its inlet connected to an outlet of said first expansion means and with its outlet connected to a suction port of said compressor;

a brine/refrigerant heat exchanger having its refrigerant line inlet connected to a fourth port of said four-way type valve through a second control valve and with its refrigerant gas line outlet connected between said first control valve and said first expansion means;

said second interior heat exchanger connected to a brine line of said brine/refrigerant heat exchanger through a pump; and said second expansion means having its inlet connected between said first control valve and said first expansion means and with its outlet connected to the other end of said exterior heat exchanger, wherein:

a second port of said four-way type valve is connected to said refrigerant gas line inlet of said brine/refrigerant heat exchanger through a third control valve; and a third port of the four-way type valve is connected to the suction port of said compressor.

21. An air conditioner for vehicles according to claim 20, wherein:

said first and second expansion means are valves capable of closing operations.

22. An air conditioner for vehicles according to claim 20, further comprising:

a control valve provided at the inlet side of said first expansion means.

23. An air conditioner for vehicles according to claim 20, further comprising:

a control valve provided at the inlet side of said second expansion means.

24. An air conditioner for vehicles according to claim 20, further comprising:

a control valve provided into at least one side of the inlet and the outlet of said brine/refrigerant heat exchanger.

25. An air conditioner for vehicles according to claim 20, further comprising:

a control valve provided between the second port of said four-way type valve and one end of said exterior heat exchanger.

26. An air conditioner for vehicles according to claim 1, including:

a four-way type valve with its first port connected to a discharge port of said compressor;

said exterior heat exchanger having its one end connected to a second port of said four-way type valve;

said first expansion means having its inlet connected to the other end of said exterior heat exchanger through a first control valve;

said first interior heat exchanger having its inlet connected to an outlet of said first expansion means and with its outlet connected to an inlet port of said compressor;

a brine/refrigerant heat exchanger having its refrigerant gas line inlet connected to a fourth port of said four-way type valve and with its refrigerant gas line outlet connected between said first control valve and said first expansion means;

said second interior heat exchanger connected to a brine line of said brine/refrigerant heat exchanger through a pump; and said second expansion means having its inlet connected between said first control valve and said first expansion means and with its outlet connected to the other end of said exterior heat exchanger, wherein:

a third port of said four-way type valve is connected to said inlet port of said compressor; and a second control valve is provided at one of the refrigerant gas line inlet and outlet sides of said brine/refrigerant heat exchanger.

27. An air conditioner for vehicles according to claim 26, wherein:

said first and second expansion means are valves capable of closing operations.

28. An air conditioner for vehicles according to claim 26, further comprising:

a control valve provided at the inlet side of said first expansion means.

29. An air conditioner for vehicles according to claim 26, further comprising:

a control valve provided at the inlet side of said second expansion means.

30. An air conditioner for vehicles according to claim 26, wherein:

a subsidiary heat source is provided for heating the brine.

31. An air conditioner for vehicles according to claim 1, including:

said exterior heat exchanger having its one end part connected to a discharge port of said compressor through a first control valve;

said first interior heat exchanger having its one end port connected to the other end port of said exterior heat exchanger through a check valve and said first expansion means and with its other end port connected to an inlet port of said compressor;

a brine/refrigerant heat exchanger with its refrigerant gas line one end port connected to the discharge port of said compressor through a second control valve and with its refrigerant gas line other end port connected between said check valve and said first expansion means; and said second interior heat exchanger connected to a brine line of the brine/refrigerant heat exchanger through a pump, wherein:

a connection point at the refrigerant gas line of said other end port of said brine/refrigerant heat exchanger is connected to the other end port of said exterior heat exchanger through said second expansion means; and the one end port of said exterior heat exchanger is connected to said inlet port of said compressor through a third control valve.

32. An air conditioner for vehicles according to claim 31, wherein:

at least either one of the first of second expansion means is a valve capable of closing operation.

33. An air conditioner for vehicles according to claim 31, further comprising:

a control valve provided at the inlet side of said first expansion means.

34. An air conditioner for vehicles according to claim 31, further comprising:

a control valve provided at the inlet side of said second expansion means.

35. An air conditioner for vehicles according to claim 31, further comprising:

a heating means provided for heating refrigerant gas or brine flowing into said second interior heat exchanger during heating.

36. An air conditioner for vehicles according to claim 31, further comprising:

a heating means provided for heating refrigerant gas flowing from said exterior heat exchanger during heating.

37. And air conditioner for vehicles comprising:

a compressor (1);

an exterior heat exchanger (3) with end port thereof connected to a discharge port of said compressor through a first control valve (40);

a first interior heat exchanger (4) with one end port thereof connected to the other end port of said exterior heat exchanger (3) through a first check valve (10) and a first expansion means (6), and with the other end port thereof connected to an inlet port of said compressor (1); and a second interior heat exchanger (5) with one end port thereof connected to the discharge port of said compressor through a second control valve (41), wherein the other end port of said second interior heat exchanger (5) is switchable, in a cooling mode, to be connected to said first expansion means (6) through a second check valve (13), while bypassing said exterior heat exchanger (3), wherein said other end port of said second interior heat exchanger (5) is switchable, in a heating mode, to be connected to said other end port of said exterior heat exchanger (3) through a second expansion means (7), and wherein said one end port of said exterior heat exchanger (3) is switchable, in said heating mode, to be connected to said inlet port of said compressor through a third control valve (42).

38. An air conditioner for vehicles according to claim 37 wherein:

at least either one of said first or second expansion means is one capable of closing operation.

39. An air conditioner for vehicles according to claim 37, further comprising:

a control valve provided at the inlet side of said first expansion means.

40. An air conditioner for vehicles according to claim 37, further comprising:

a control valve provided at the inlet side of said second expansion means.

41. An air conditioner for vehicles according to claim 37, further comprising:

a heating means provided for heating refrigerant gas or brine flowing into said second interior heat exchanger during heating.

42. An air conditioner for vehicles according to claim 37, further comprising:

a heating means provided for heating refrigerant gas flowing from said exterior heat exchanger during heating.

\* \* \* \* \*